US008379054B2

(12) United States Patent
Katayama et al.

(10) Patent No.: US 8,379,054 B2
(45) Date of Patent: Feb. 19, 2013

(54) IMAGE SYNTHESIS METHOD, IMAGE SYNTHESIS APPARATUS, AND STORAGE MEDIUM

(75) Inventors: Tatsushi Katayama, Tokyo (JP); Hideo Takiguchi, Kawasaki (JP); Kataro Yano, Tokyo (JP); Kenji Hatori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 587 days.

(21) Appl. No.: 11/474,999

(22) Filed: Jun. 27, 2006

(65) Prior Publication Data

US 2006/0238536 A1    Oct. 26, 2006

Related U.S. Application Data

(63) Continuation of application No. 09/624,385, filed on Jul. 27, 2000, now Pat. No. 7,098,914.

(30) Foreign Application Priority Data

Jul. 30, 1999    (JP) .................................. 1999-217194
Aug. 17, 1999    (JP) .................................. 1999-230476

(51) Int. Cl.
*G09G 5/00*    (2006.01)
(52) U.S. Cl. ........ 345/629; 345/419; 345/427; 345/619; 382/154; 382/254; 382/284; 382/294; 382/305
(58) Field of Classification Search .................. 345/634, 345/629, 619, 419–428; 382/154, 254, 284, 382/294, 305
See application file for complete search history.

(56) References Cited

U.S. PATENT DOCUMENTS

| 5,960,108 A | 9/1999 | Xiong ........................... 382/154 |
| 5,963,664 A | 10/1999 | Kumar et al. .................... 348/47 |
| 6,097,854 A | 8/2000 | Szeliski et al. ................ 345/634 |
| 6,104,840 A | 8/2000 | Ejiri et al. ..................... 382/284 |
| 6,246,412 B1 | 6/2001 | Shum et al. .................... 345/419 |

(Continued)

FOREIGN PATENT DOCUMENTS

| JP | 5-093849 | 4/1993 |
| JP | 8-194246 | 7/1996 |

(Continued)

OTHER PUBLICATIONS

Office Action dated Jan. 6, 2009, in corresponding Japanese Patent Application No. 11-230476.

(Continued)

*Primary Examiner* — Jin-Cheng Wang
(74) *Attorney, Agent, or Firm* — Fitzpatrick, Cella, Harper & Scinto

(57) ABSTRACT

An image synthesis method includes a placement information obtaining step of obtaining placement information about a plurality of images in which adjacent images have a common subject region, and a synthesis step of combining the images using a mapping mode in accordance with the placement information. Prior to performing mapping transformation of the input images, coordinate-space transformation parameters for transforming the coordinate space of one image among the images into the coordinate space of another image are generated. The images are combined based on a given mapping mode and the coordinate-space transformation parameters.

7 Claims, 27 Drawing Sheets

U.S. PATENT DOCUMENTS

| | | | |
|---|---|---|---|
| 6,246,413 B1 * | 6/2001 | Teo | 345/419 |
| 6,271,855 B1 * | 8/2001 | Shum et al. | 345/427 |
| 6,389,179 B1 | 5/2002 | Katayama et al. | 382/284 |
| 6,392,658 B1 | 5/2002 | Oura | 345/629 |
| 6,393,162 B1 | 5/2002 | Higurashi | 382/284 |
| 6,424,752 B1 | 7/2002 | Katayama et al. | 382/284 |
| 6,434,265 B1 | 8/2002 | Xiong et al. | 382/154 |
| 6,486,908 B1 | 11/2002 | Chen et al. | 348/39 |
| 6,507,359 B1 | 1/2003 | Muramoto et al. | 348/47 |
| 6,515,696 B1 | 2/2003 | Driscoll et al. | 348/335 |
| 6,532,036 B1 | 3/2003 | Peleg et al. | 348/36 |
| 6,549,681 B1 | 4/2003 | Takiguchi et al. | 382/294 |
| 6,704,041 B2 | 3/2004 | Katayama et al. | 348/36 |
| 6,714,689 B1 | 3/2004 | Yano et al. | 382/284 |
| 6,788,828 B2 | 9/2004 | Katayama et al. | 382/284 |
| 2002/0126890 A1 | 9/2002 | Katayama et al. | 382/154 |

FOREIGN PATENT DOCUMENTS

| | | |
|---|---|---|
| JP | 9-097326 | 4/1997 |
| JP | 09-322040 | 12/1997 |
| JP | 11-073492 | 3/1999 |
| JP | 11-112790 | 4/1999 |
| JP | 11-213141 | 8/1999 |

OTHER PUBLICATIONS

Office Action dated Feb. 24, 2009, in corresponding Japanese Patent Application No. 11-217194.

* cited by examiner

ONE-DIMENSIONAL HORIZONTAL PLACEMENT

VERTICAL CYLINDER

ONE-DIMENSIONAL VERTICAL PLACEMENT

HORIZONTAL CYLINDER

TWO-DIMENSIONAL TILED PLACEMENT

SPHERE

FIG. 16

| HORIZONTAL SIZE (PIXEL) | 1200 |
| --- | --- |
| VERTICAL SIZE (PIXEL) | 600 |
| HORIZONTAL SIZE (deg.) | 100° |
| VERTICAL SIZE (deg.) | 35° |

FIG. 25A
FIG. 25B
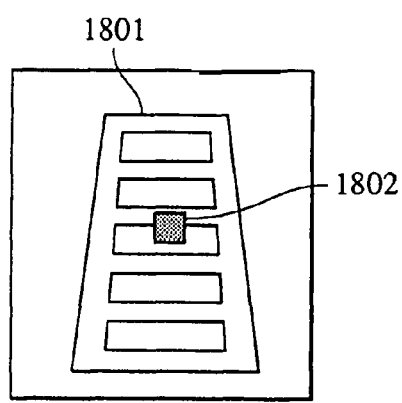
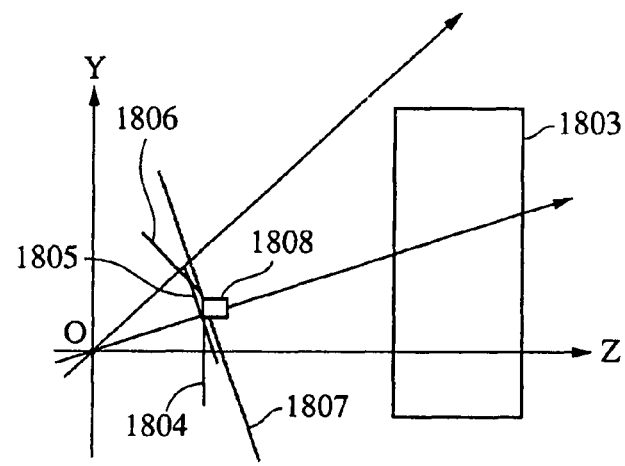

FIG. 26A
FIG. 26B
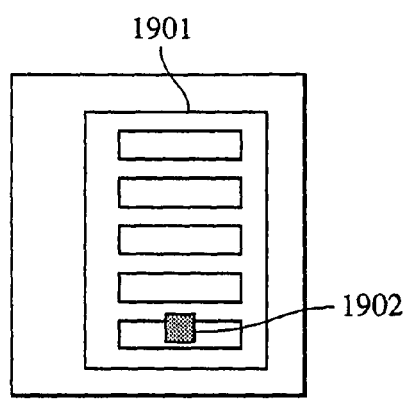
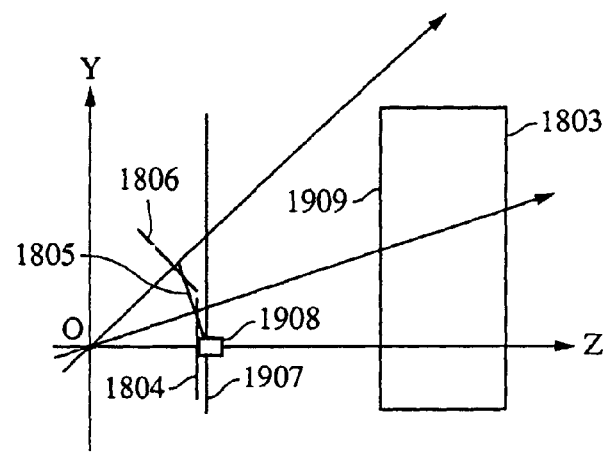

IMAGE SYNTHESIS METHOD, IMAGE SYNTHESIS APPARATUS, AND STORAGE MEDIUM

This is a continuation of application Ser. No. 09/624,385, filed on Jul. 27, 2000.

BACKGROUND OF THE INVENTION

1. Field of the Invention

The present invention relates to technology for combining a plurality of images in which adjacent images have a common subject region and generating a synthesized image.

2. Description of the Related Art

Hitherto, the synthesis of a panoramic image by combining a plurality of images is performed by a conventional method of capturing images of a subject in a plurality of regions and synthesizing a single image using image information about a common subject region, as shown in FIG. 10. FIG. 11 shows a sectional view taken through the XZ plane of FIG. 10. As shown in FIG. 11, an image synthesis method includes a mode (planar mapping mode) of mapping captured images onto a single plane 800 and synthesizing an image or a mode (cylinder mapping mode) of mapping the images onto a virtual cylindrical surface 801 having a radius f and synthesizing an image. FIG. 12 schematically shows a synthesized image obtained when the images are mapped onto the plane 800.

In the conventional panoramic image synthesis method, it is necessary to synthesize an image in a predetermined mapping mode. Alternatively, a user is required to manually set a mapping mode.

For example, when a plurality of images captured by horizontal panning are combined into a synthesized image in the planar mapping mode, as shown in FIG. 12, an image with distorted edges is generated due to a wide horizontal viewing angle. When a synthesized image is formed on a region in which the horizontal viewing angle is 180° or greater in the planar mapping mode, the synthesized image cannot be mapped on a single plane, possibly causing a serious apparatus failure.

It is burdensome to conform to various imaging modes, i.e., a horizontally-rotating (panning) mode shown in FIG. 10, a vertically-rotating (tilting) mode, and a horizontally/vertically-rotating (panning/tilting) mode, and to designate an appropriate mapping mode from among these mapping modes. When the user is not knowledgeable about these mapping modes, the user may fail to select the appropriate mapping mode.

In the conventional panoramic image synthesis method, an appropriate mapping method is selected and set prior to generating necessary parameters for synthesis processing. Using this mapping method, an input image is mapped and transformed. Subsequently, the parameters indicating the positional relationship among a plurality of images are generated based on corresponding point information, and a synthesized image is generated.

When the mapping method is subsequently changed and a synthesized image is again generated since the previously-selected mapping mode is inappropriate, it is necessary to re-input the images, to perform mapping transformation in another mapping mode, and to perform complicated image synthesis processing. In other words, it is necessary to again perform processing from the beginning to generate the parameters. This places a heavy computational burden on the apparatus, requires a long processing time, and is extremely inefficient.

SUMMARY OF THE INVENTION

Accordingly, it is an object of the present invention to solve at least one of the above problems.

Another object of the present invention is to provide an image synthesis method, an image synthesis apparatus, and a storage medium in which a mapping mode is easily set when synthesizing an image.

Another object is to enable a user to select a mapping mode with a simple operation so as to select an appropriate mapping mode without detailed knowledge.

According to an aspect of the present invention, the foregoing objects are achieved through provision of an image synthesis method including a placement information obtaining step of obtaining placement information about a plurality of images in which adjacent images have a common subject region, and a synthesis step of combining the images using a mapping mode in accordance with the placement information.

In order to perform more accurate image synthesis, the image synthesis method may include a focal length obtaining step of obtaining focal length information of each of the images. In the synthesis step, the mapping mode may be used in accordance with the focal length information and the placement information.

Another object of the present invention is to change the mapping mode to an appropriate mapping mode even when the mapping mode is not appropriately selected using the placement information or when the selected mapping mode differs from a mapping mode preferred by the user.

To this end, the image synthesis method may include a changing step of changing the mapping mode.

It is another object of the present invention to inhibit the user from performing inappropriate image synthesis when the mapping mode is inappropriately changed.

To this end, the image synthesis method may include a generating step of issuing, when an image formed by changing the mapping mode in the changing step does not comply with a predetermined condition set in accordance with the mapping mode, a warning and generating a synthesized image in accordance with the predetermined condition.

Another object of the present invention to provide a visually beautiful image after synthesizing an image.

To this end, the image synthesis method may include a displaying step of displaying a cuttable rectangular region without a margin when the synthesized image is displayed.

It is another object of the present invention to provide an image synthesis method, an image synthesis apparatus, and a storage medium in which the mapping mode is quickly changed.

According to an aspect of the present invention, the foregoing objects are achieved through provision of an image synthesis method including a generating step of generating, prior to performing mapping transformation of input images, coordinate-space transformation parameters for transforming a coordinate space of one image among the images into a coordinate space of another image, and an image synthesis step of combining the images based on a given mapping mode and the coordinate-space transformation parameters.

It is an object of the present invention to change the mapping mode to an appropriate mapping mode even when the mapping mode is not appropriately selected or when the selected mapping mode differs from a mapping mode preferred by the user.

To this end, the image synthesis method may include a changing step of changing the mapping mode. In the image synthesis step, coordinate transformation parameters set for each mapping mode may be changed and the input images may be again combined in accordance with a mapping mode changing instruction.

Another object of the present invention is to enable the user to arbitrarily select a reference position of a synthesized image.

To this end, the image synthesis method may include a reference position setting step of arbitrarily setting a reference position of a synthesized image. In the image synthesis step, the images may be combined in accordance with the reference position set in the reference position setting step.

Another object of the present invention is to smoothly restore the mapping mode to the previous mapping mode after the mapping mode is changed.

To this end, the image synthesis method may include a storage step of storing a generated panoramic synthesized image, and coordinate transformation parameters and the coordinate-space transformation parameters, which are used for generating the panoramic synthesized image, every time the synthesized image is generated in the image synthesis step.

It is another object of the present invention to smoothly restore the synthesized image to the previous condition after processing the synthesized image.

According to another aspect of the present invention, the foregoing objects are achieved through provision of an image synthesis apparatus. The image synthesis apparatus combines a plurality of images into a synthesized image. Every time the synthesized image is edited, a newly generated synthesized image is stored.

As described above, an appropriate mapping mode can be easily set. A panoramic synthesis image is obtained without special knowledge. The mapping mode can be selected in a more accurate manner. A user can intentionally select a different mapping mode. Hence, flexibility is provided in selecting the mapping mode. When the user inappropriately changes the mapping mode, the user is warned of the incorrect operation and obtains the synthesized image. It is possible to cut a region without a margin, and that region can be printed or stored. A synthesized image can be generated in any mapping mode by using common coordinate-space transformation parameters and performing processing in accordance with the mapping mode. Because computation of the coordinate-space transformation parameters is omitted when the mapping mode is changed, the processing time is substantially decreased when the mapping mode is changed. It is possible to generate a synthesized image of enhanced quality because the synthesized image need not be transformed again. The user is enabled to set a reference position at a desired position when generating a synthesized image. This flexibly implements geometric correction, such as tilting and shifting correction. By reading a number of synthesized images and coordinate-space transformation parameters generated by changing the mapping mode or setting the reference position, a synthesis result can be obtained at an arbitrary point. The previously-generated images are quickly read, thereby improving efficiency in the editing operation.

Further objects, features and advantages of the present invention will become apparent from the following description of the preferred embodiments with reference to the attached drawings.

BRIEF DESCRIPTION OF THE DRAWINGS

FIG. 16 is a schematic illustration of image information displayed for setting the displayable range;

FIGS. 25A and 25B are illustrations of image transformation in which a reference position is changed;

FIGS. 26A and 26B are illustrations of the image transformation in which the reference position is changed;

DESCRIPTION OF THE PREFERRED EMBODIMENTS

Figure 1:
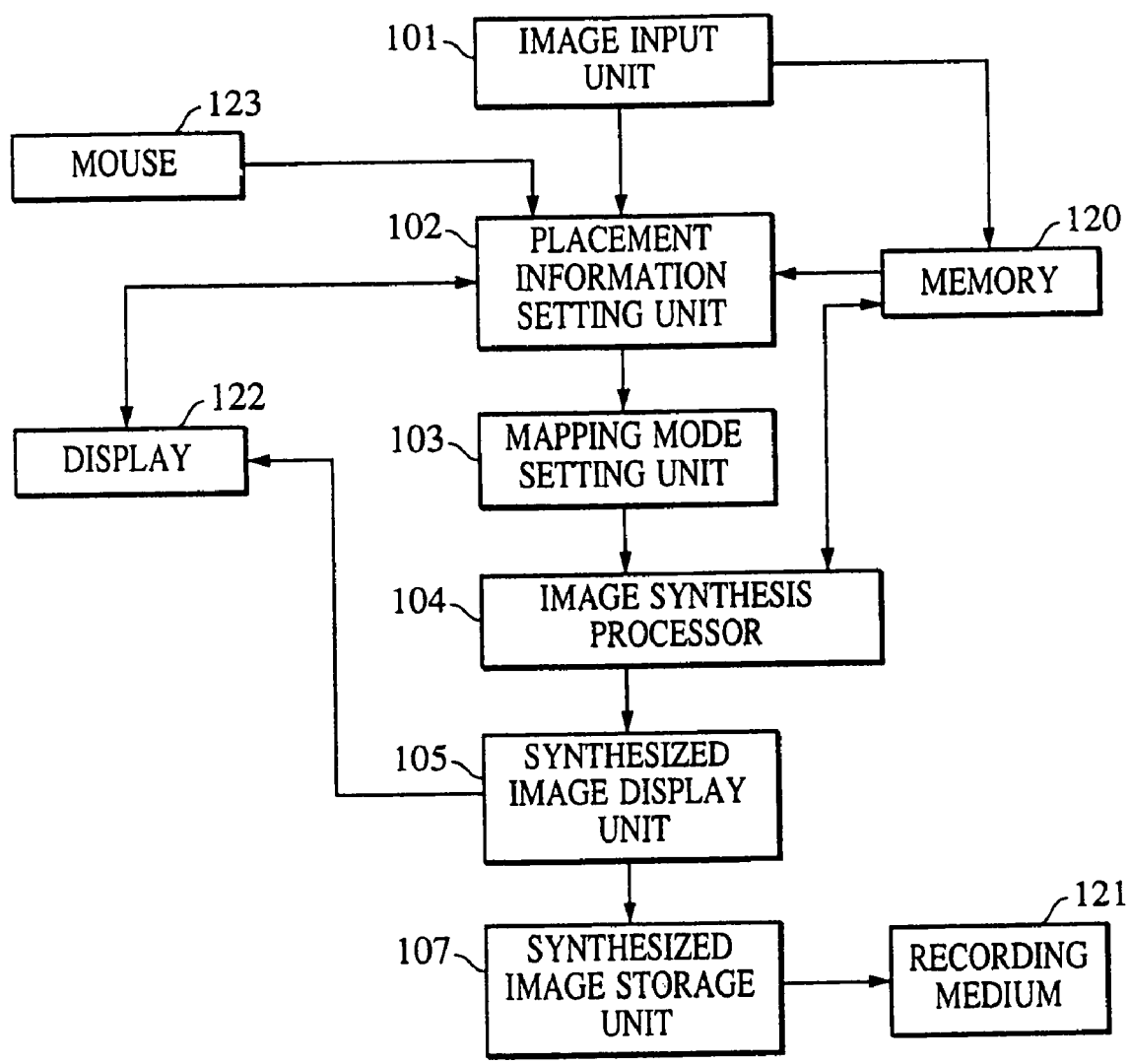
FIG. 1 is a block diagram of a panoramic image synthesis method and apparatus according to a first embodiment of the present invention.

FIG. 1 schematically shows a panoramic image synthesis method and apparatus according to a first embodiment of the present invention. Referring to FIG. 1, an image input unit 101 inputs a plurality of images to be used for image synthesis. A placement information setting unit 102 sets the placement relationship among the input images. A mapping mode setting unit 103 automatically sets a mapping mode for synthesizing an image based on the information from the placement information setting unit 102. An image synthesis processor 104 generates synthesis parameters among the images and generates a synthesized image. A synthesized image display unit 105 displays the synthesized image formed by combining the images based on the synthesis parameters. A synthesized image storage unit 107 stores the resultant synthesized image in a recording medium 121 or the like.

Figure 2:
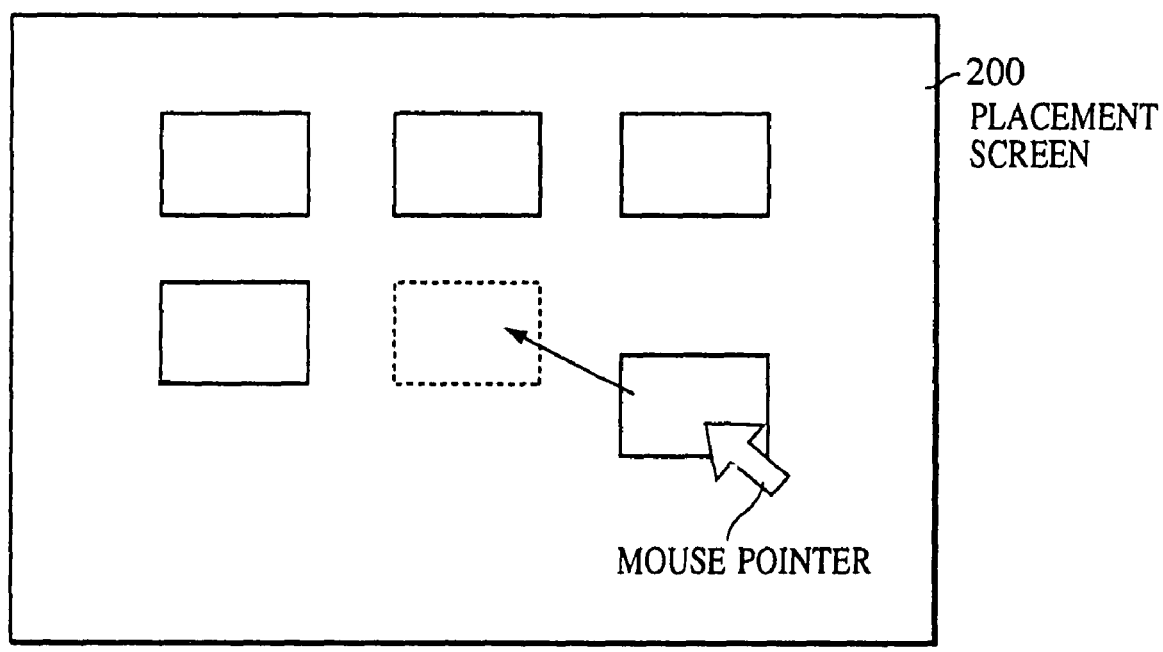
FIG. 2 is a schematic illustration of a placement screen.

The image input unit 101 inputs a plurality of images. The images can be input by reading images recorded in a recording medium, such as a magnetic disk. Alternatively, the images can be read from a non-volatile memory or the like that maintains image signals obtained through an image capturing system, such as a digital camera. The read images are temporarily stored in a memory 120. The images are read from the memory 120, and they are displayed on a display 122 for displaying the placement of the images. FIG. 2 schematically shows a placement screen 200. A user places the images on the screen 200. The placement can be done by moving the images on the screen 200 using a device, such as a mouse 123. Also, it is possible to input a code for indicating the position of each image for performing the placement.

A camera or the like can record information about the placement at the same time as capturing the images. The placement position recorded with the images can be read when the images are input. Based on this placement position, the placement information can be automatically set.

Figure 3A:
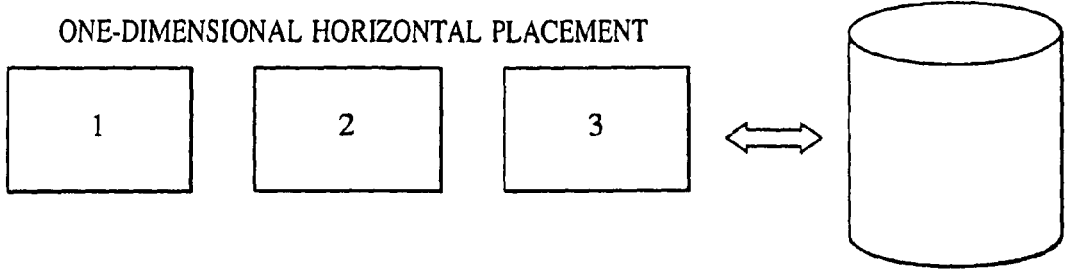
FIGS. 3A to 3C are schematic illustrations of placement patterns in mapping modes.
Figure 3B:
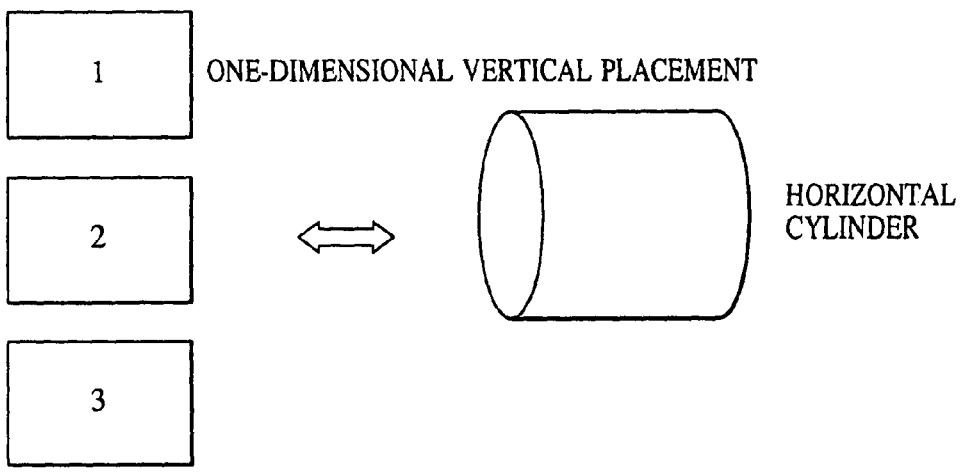
Figure 3C:
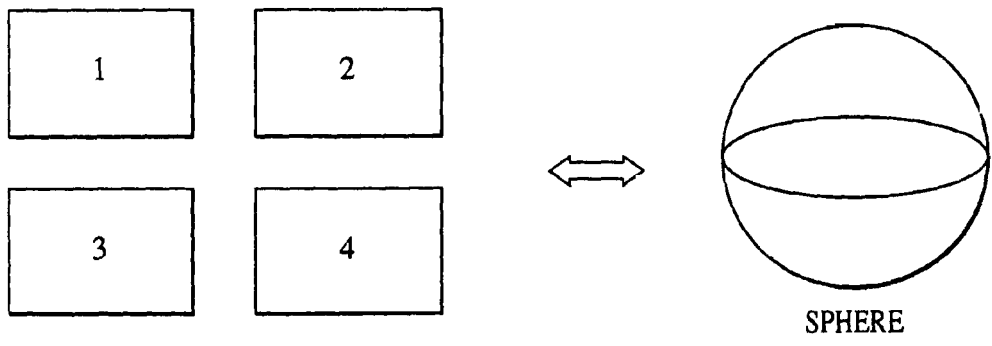

FIGS. 3A to 3C show-placement patterns. FIG. 3A shows a placement pattern formed when the images are captured in the one-dimensional horizontal direction. FIG. 3B shows a placement formed when the images are captured in the one-dimensional vertical direction. FIG. 3C shows a placement pattern formed when the images are captured in a two-dimensional tiled arrangement.

The mapping mode setting unit 103 sets a mapping mode for synthesizing a panoramic image based on the placement information set by the placement information setting unit 102.

FIGS. 3A to 3C illustrate an example of setting a mapping mode according to the placement of the images. The mapping mode is set as follows. When the placement of the images is in the one-dimensional horizontal direction, as shown in FIG. 3A, the images are mapped as if they are pasted onto a surface of a vertical cylinder. When the placement is in the one-dimensional vertical direction, as shown in FIG. 3B, a synthesized image is mapped as if it is pasted on a surface of a horizontal cylinder, which is a horizontally-aligned cylinder. When the images are arranged in the two-dimensional tiled placement, as shown in FIG. 3C, the images are mapped as if they are pasted on the surface of a sphere shown in FIG. 3C.

Accordingly, when the images are obtained in the one-dimensional horizontal direction, a synthesized image will have a wider horizontal viewing angle (360° maximum). Hence, the vertical-cylinder mapping is set, as shown in FIG. 3A, and the synthesized image can display the entire image region. Similarly, when the images are provided in a different placement pattern, the synthesized image can display the entire image region by automatically setting an appropriate mapping mode according to the placement pattern.

Figure 5:
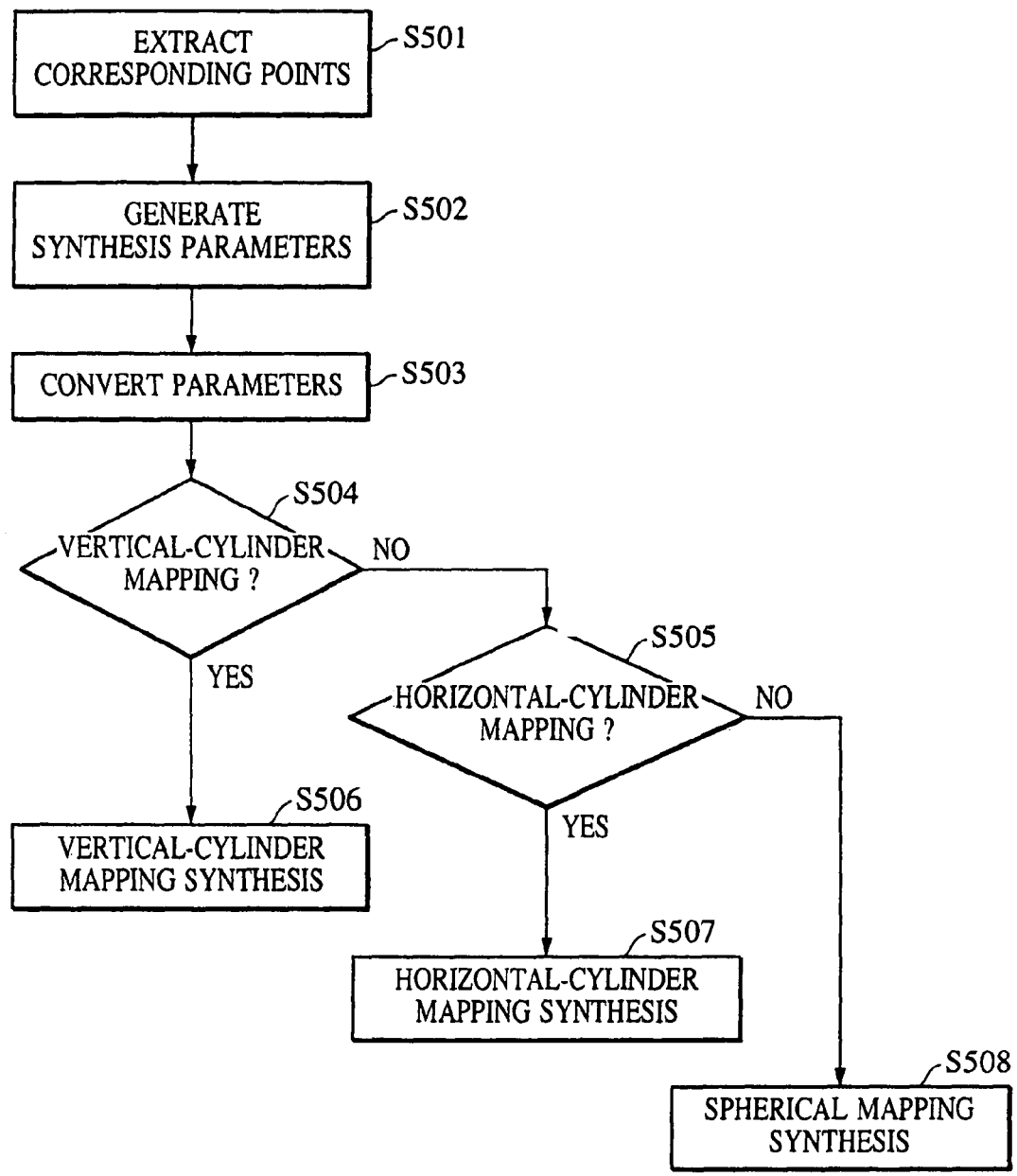
FIG. 5 is a flowchart showing a process performed by an image synthesis processor of the first embodiment.

After the mapping mode is set by the mapping mode setting unit 103, as described above, the image synthesis processor 104 performs image synthesis processing. Subsequent to the confirmation of the mapping mode, synthesis parameters are generated by a method as described in Japanese Laid-Open Patent No. 9322040. FIG. 5 shows a flowchart showing a process performed by the image synthesis processor 104.

Figure 4:
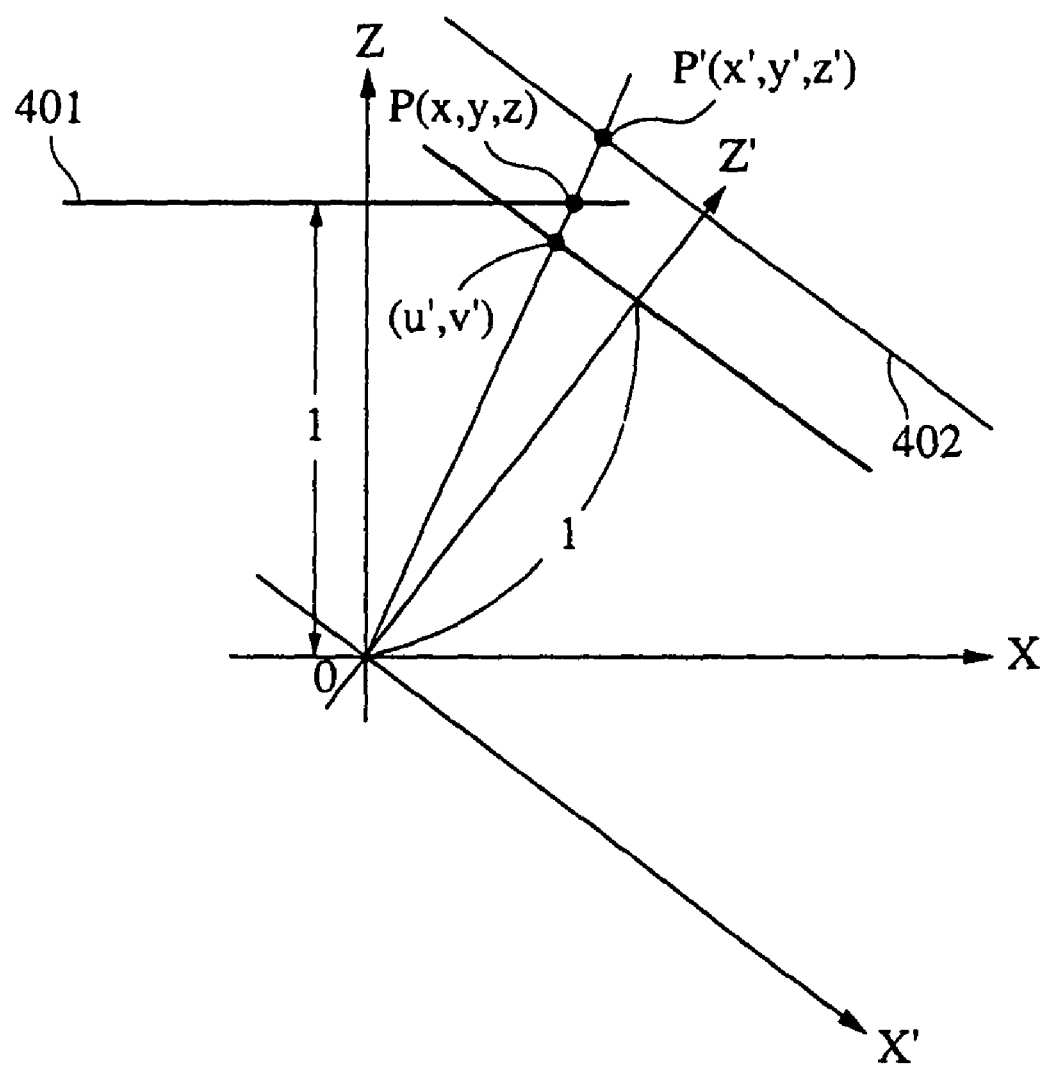
FIG. 4 is an illustration of synthesis parameters.

In step S501, corresponding points are extracted using image information about a subject region shared by two adjacent images as shown in FIG. 4. The corresponding points can be extracted by a known technique, such as a correlation method or a template matching method.

The synthesis parameters are generated using the corresponding point information obtained in step S501. The parameters can be generated as follows. As shown in FIG. 4, two adjacent images 401 and 402 have a point P (x, y, z) on the image 401 and a corresponding point P' (x', y', z') on the image 402, respectively. The relationship between pixels on the two images 401 and 402 can be expressed by eight parameters (m1 to m8) as follows:

$$\begin{pmatrix} x' \\ y' \\ z' \end{pmatrix} = \begin{pmatrix} m_1 & m_2 & m_3 \\ m_4 & m_5 & m_6 \\ m_7 & m_8 & 1 \end{pmatrix} \begin{pmatrix} x \\ y \\ z \end{pmatrix} \quad (1)$$

Eight simultaneous equations can be solved by using the equation (1) and the coordinates of the corresponding points, thereby computing the eight parameters (m1 to m8). Alternatively, the parameters can be estimated more accurately by performing optimization, such as a least-squares method, using information about numerous corresponding points.

When the point P' is mapped on a plane at the distance of one, which is the same distance as the image plane on which the point P is disposed, the X-Y coordinates of (u', v') are obtained as u'=x'/z' and V'=y'/z'.

The parameters generated in step S502 give relational expressions between the two images. Specifically, the relational expressions are obtained as parameters based on the coordinate system of the image 401 in FIG. 4. In step S503, these parameters are converted into parameters (M1 to M8) with respect to the reference coordinate system used when combining all the images.

In steps S504 and S505, the process is branched to three mapping synthesis processing steps in steps S506 to S508 in accordance with the mapping mode set by the mapping mode setting unit 103 shown in FIG. 1.

The three mapping synthesis processing steps are described below.

Figure 6A:
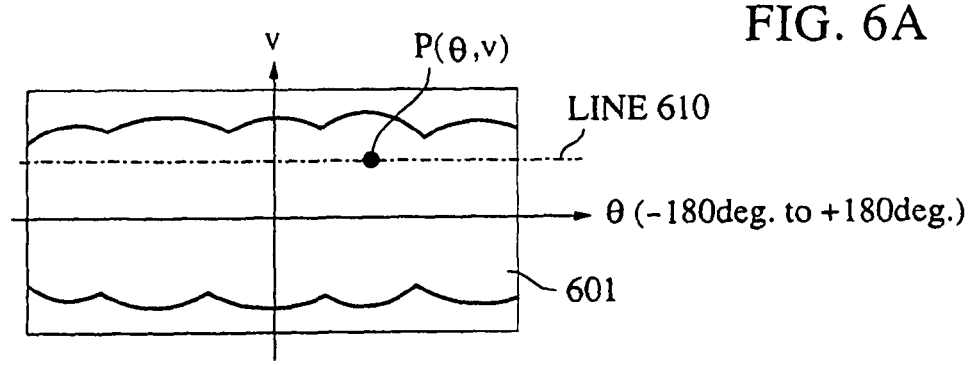
FIGS. 6A to 6C are illustrations of synthesized images obtained by mapping.

In step S506, the vertical-cylinder mapping synthesis is performed. The vertical-cylinder mapping generates a synthesized image mapped onto the vertical cylinder as shown in FIG. 3A. FIG. 6A schematically illustrates a synthesized image 601 obtained by the vertical cylinder mapping. The horizontal coordinate is expressed by θ (deg.) and the vertical coordinate is expressed by v. Hence, the displayable range of the synthesized image 601 in the horizontal direction is from −180 deg. to +180 deg.

Figure 7:
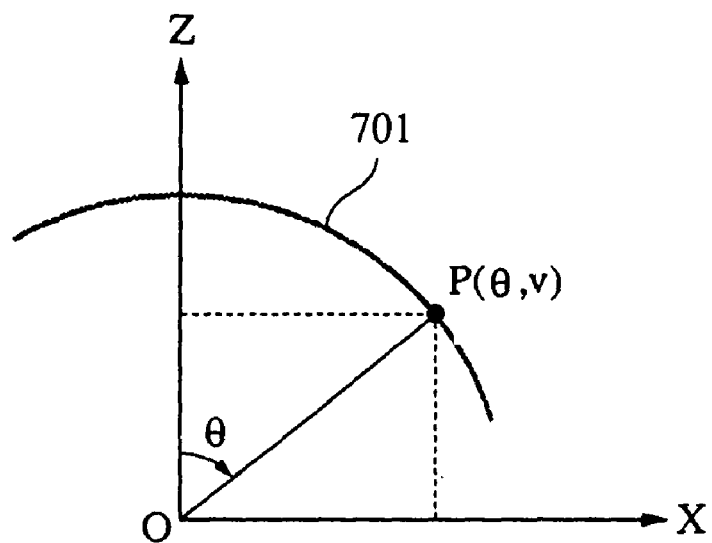
FIG. 7 is an illustration of vertical-cylinder mapping.

FIG. 7 shows a sectional view of the vertical cylinder. Referring to FIG. 7, a sectional view 701 is taken along a line 610 of the synthesized image 601 obtained by the vertical-cylinder mapping as shown in FIG. 6A. The radius of the cylinder is one. A point P (θ, v) in FIG. 6A indicates the same point as a point P in FIG. 7. In order to perform mapping synthesis, the point P (θ, v) on the surface of the cylinder is transformed into an XYZ reference coordinate system as:

$x = \sin \theta$ $y = v$ $z = \cos \theta$ \quad (2)

The equation (1) are solved using the converted coordinates (x, y, z), thus obtaining the coordinates (x', y', z') corresponding to the point P (θ, v). Reference to the pixel levels of the coordinates is used to synthesize the image. Alternatively, as described above, it is possible to perform the transformation as u'=x'/z' and v'=y'/z', and to make reference to the pixel levels of the coordinates (u', v') of the point P on the image.

In step S506, the vertical-cylinder mapping synthesis processing obtains the synthesized image by generating pixel levels of coordinates corresponding to the point P (θ, v) in FIG. 6A.

Figure 6B:
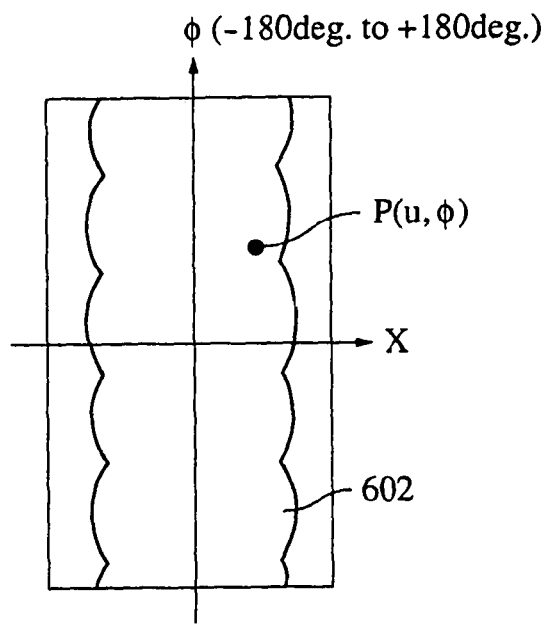

In step S507, the horizontal-cylinder mapping synthesis processing generates the XYZ coordinates corresponding to a point P (u, φ) on a synthesized image 602 obtained by the horizontal-cylinder mapping in FIG. 6B as follows:

$x=u$ $y=\sin \phi$ $z=\cos \phi$ (3)

The horizontal-cylinder mapping synthesis processing obtains the pixel levels of the corresponding points by the same calculation as in the vertical-cylinder mapping synthesis processing. Hence, the description of the subsequent processing is omitted.

Figure 6C:
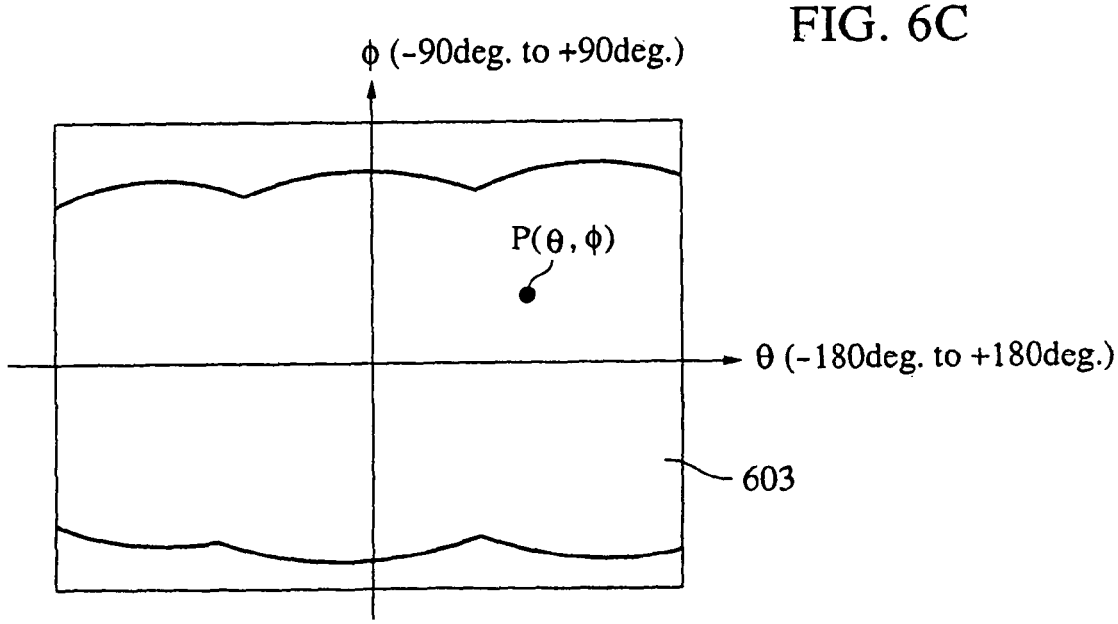
Figure 8:
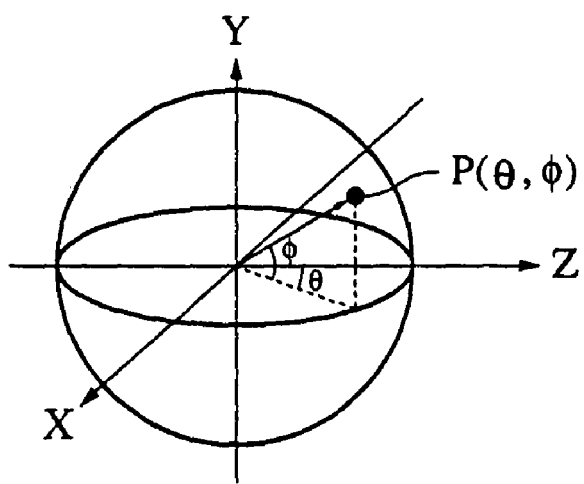
FIG. 8 is an illustration of spherical mapping.

In step S508, the spherical mapping synthesis processing obtains a synthesized image 603 by the spherical mapping, as shown in FIG. 6C. The horizontal axis of the synthesized image 603 indicates a horizontal viewing angle, and the vertical axis indicates a vertical viewing angle. The horizontal displayable range of the synthesized image 603 is from −180 deg. to +180 deg., and the vertical displayable range is from −90 deg. to +90 deg. As shown in FIG. 8, a point P (θ, φ) on the synthesized image 603 can be converted into the XYZ coordinates by:

$x=\cos \phi \sin \theta$ $y=\sin \theta$ $z=\cos \theta \cos \theta$ (4)

The radius of the sphere is one.

In a manner similar to the above synthesis processing, the synthesized image is generated by obtaining the pixel levels of the corresponding points.

A generated panoramic synthesized image is displayed on the display 122 by the synthesized image display unit 105 shown in FIG. 1. The image can be stored by the synthesized image storage unit 107 in the recording medium 121, such as the magnetic disk.

The recording medium 121 is not limited to the magnetic disk. Needless to say, any known medium can be used as the recording medium 121.

As described above, the mapping mode can be easily set by setting the appropriate mapping mode based on the image placement information. By automatically setting the mapping mode based on the placement information, the user is not required to manually set the mapping mode when synthesizing an image. Hence, the panoramic synthesized image can be obtained without special knowledge.

Alternatively, it is possible to notify the user of an appropriate mapping mode, and to make the user designate the actual mapping mode to be used when synthesizing an image. Although the user is required to perform some work in this case, the user is permitted to intentionally select a mapping mode differing from the appropriate one. This provides flexibility in selecting the mapping mode.

Figure 9:
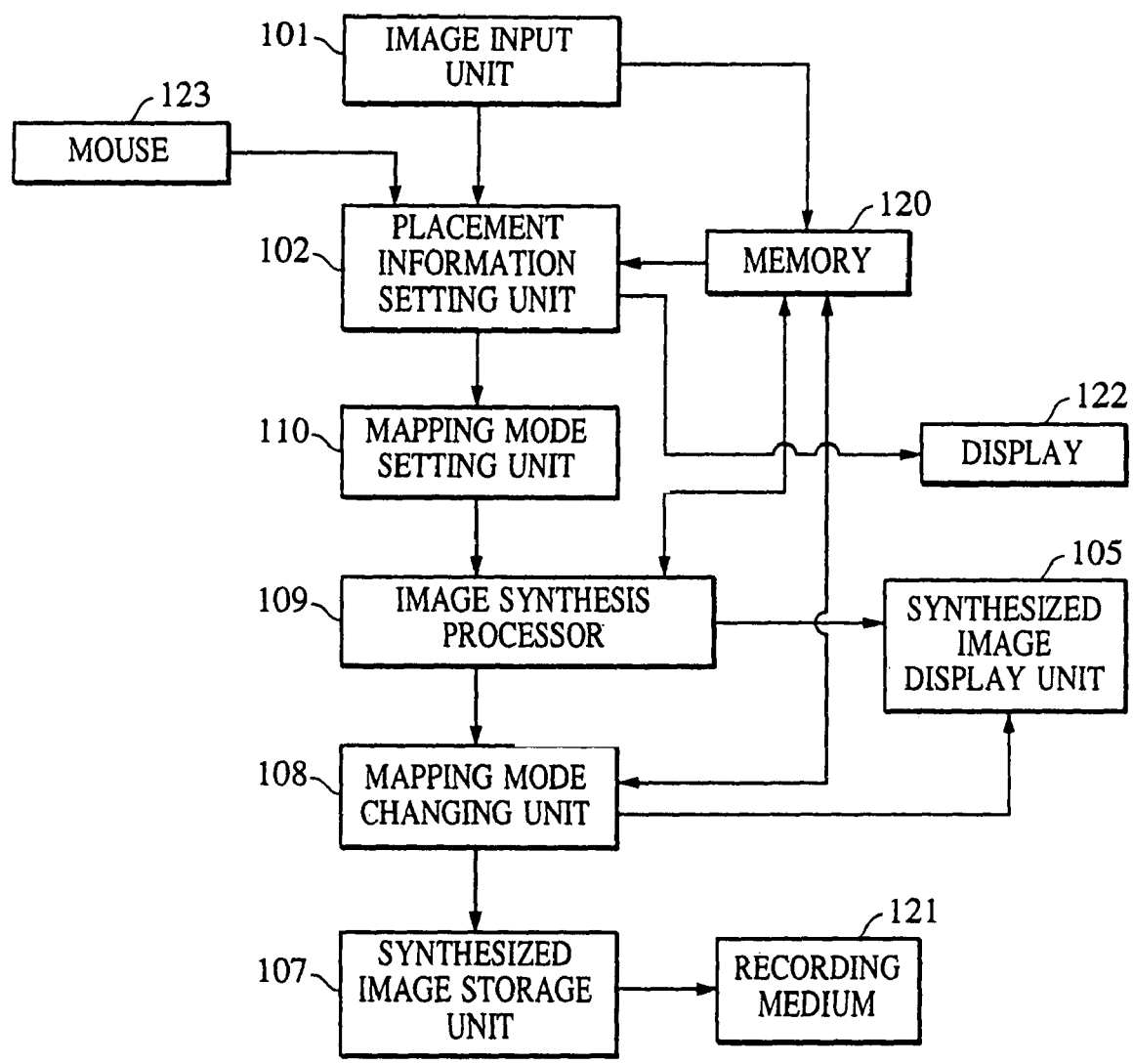
FIG. 9 is a block diagram of a panoramic image synthesis method and apparatus according to a second embodiment of the present invention.
Figure 10:
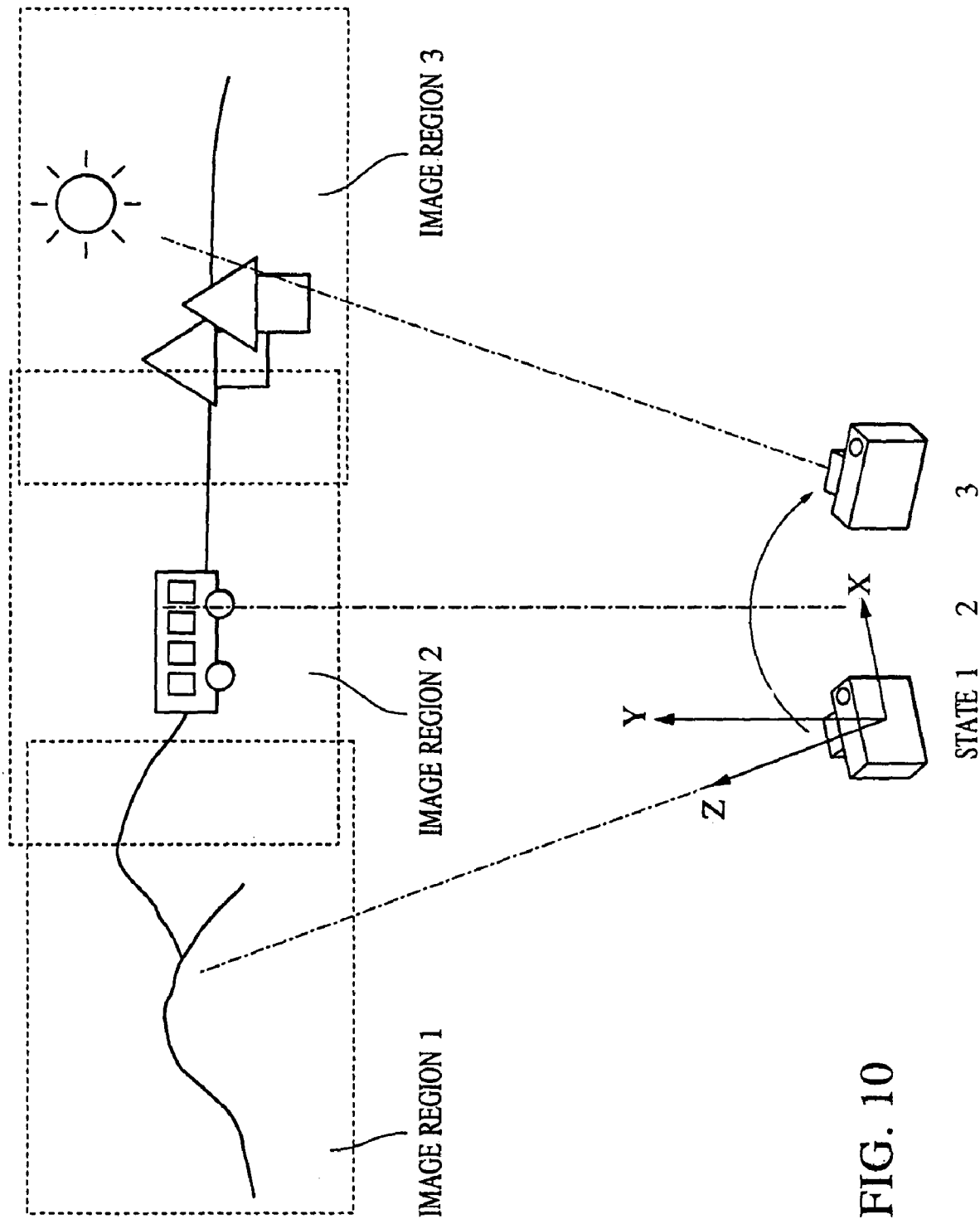
FIG. 10 is a schematic illustration of conventional image capturing.
Figure 11:
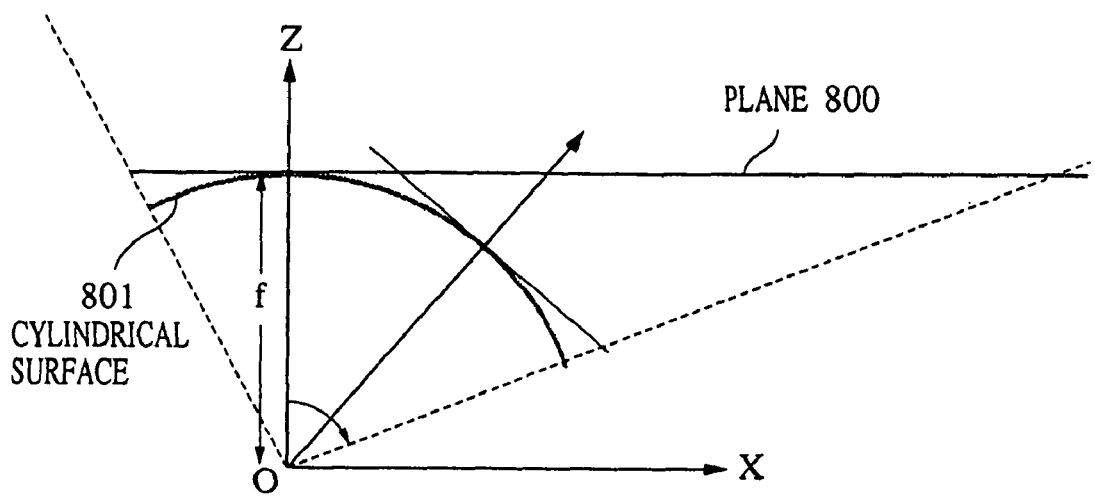
FIG. 11 is a schematic illustration of conventional mapping synthesis.
Figure 12:
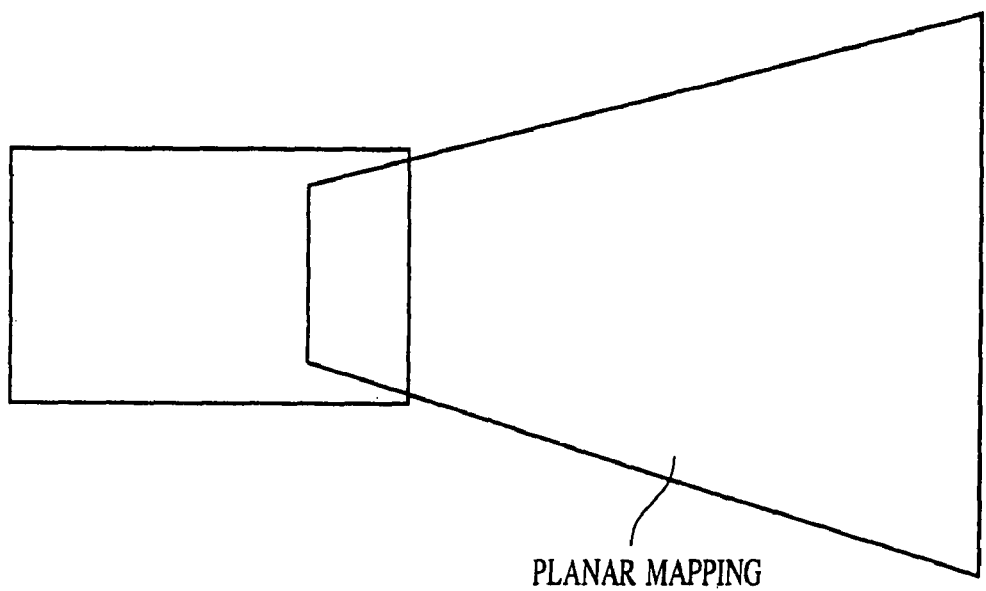
FIG. 12 is a schematic illustration of a conventional planar mapping synthesis mode.

FIG. 9 shows a panoramic image synthesis method and apparatus according to a second embodiment of the present invention. The characteristic portions of the second embodiment include a mapping mode setting unit 110, an image synthesis processor 109, and a mapping mode changing unit 108. The remaining portions are the same as the first embodiment and have the same reference numerals as those of the first embodiment. Hence, the description of the common portions is omitted.

The basic operation of the mapping mode setting unit 110 is the same as that of the first embodiment. Based on the placement information from a placement information setting unit 102, the mapping mode setting unit 110 sets the vertical-cylinder mapping mode when the images are captured in the one-dimensional horizontal direction, the horizontal-cylinder mapping mode when the images are captured in the one-dimensional vertical direction, and the spherical mapping mode when the images are captured in the two-dimensional tiled placement. The mapping mode setting unit 110 of the second embodiment obtains focal length information of an image using a focal length obtaining unit (not shown). Based on the focal length information, the mapping mode setting unit 110 generates a horizontal viewing angle Wh and a vertical viewing angle Wv of the image.

When the vertical-cylinder mapping mode is set based on the placement information, the vertical viewing angle Wv is referred to and is compared with a predetermined reference value. When the vertical viewing angle Wv is larger than the reference value, the mapping mode is changed from the vertical-cylinder mapping mode to the spherical mapping mode. Since the vertical-cylinder mapping mode performs vertical transformation in the same manner as the planar mapping mode, peripheral portions are noticeably deteriorated when the viewing angle is wide. As described above, the mapping mode can be selected more accurately by setting the mapping mode based on the focal length information as well.

In the above example, even when the mapping mode is selected based on the placement information, it is possible to refer to the horizontal viewing angle Wh and the vertical viewing angle Wv, and to change the mapping mode. Alternatively, the mapping mode can be selected from the beginning based on the placement information and the viewing angle information.

The mapping mode changing unit 108 can be separated from the mapping mode setting unit 110, and the mapping mode can be changed in response to an instruction from the user. In this case, preferable mapping modes can be automatically selected based on the placement information and the viewing angle information, and the user can select one from among these mapping modes.

With this arrangement, the preferable mapping mode can be selected even when the mapping mode is changed.

Figure 13A:
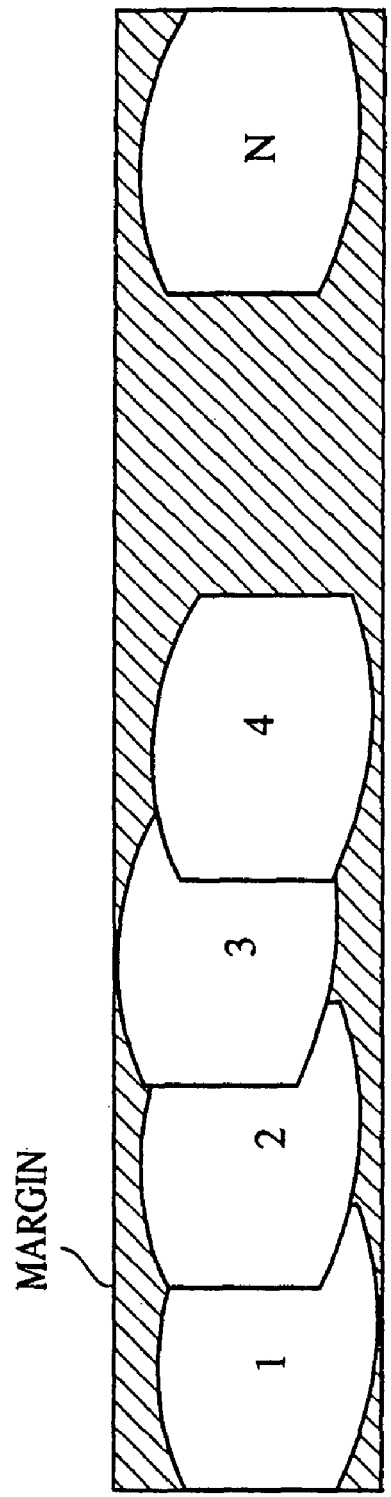
FIGS. 13A and 13B are schematic illustrations of synthesized images obtained by vertical-cylinder mapping.
Figure 13B:
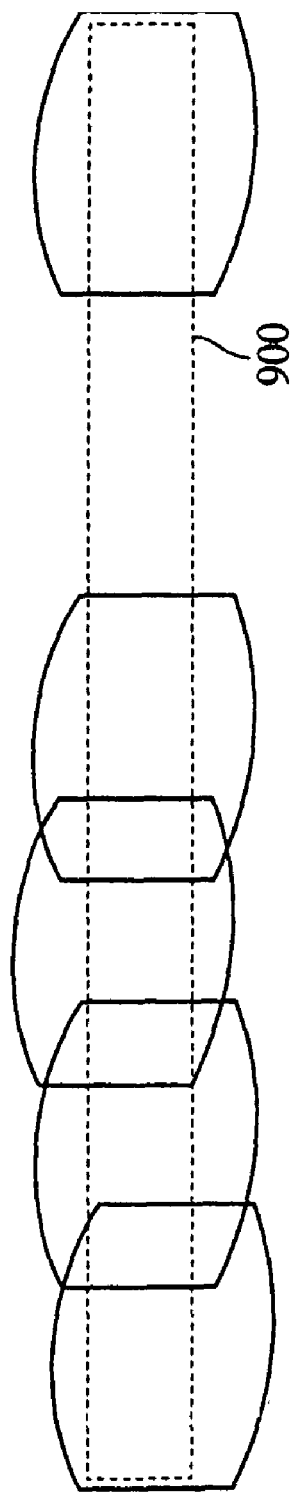

The basic operation of the image synthesis processor 109 is the same as that of the first embodiment. FIGS. 13A and 13B illustrate the vertical-cylinder mapping synthesis performed by the image synthesis processor 109 of the second embodiment. Referring to FIG. 13A, the shadowed portion indicates a margin indicating a region not included in visual fields of captured images. Basically, a synthesized image is generated including the margin, as shown in FIG. 13A. Referring to FIG. 13B, a rectangular image region 900 not including the margin can be computed, and the image region 900 indicated by dotted lines can be displayed with the synthesized image.

Accordingly, a visually beautiful image can be synthesized based on ill-looking images having jagged peripheries.

A synthesized image storage unit 107 can selectively store only the interior of the dotted region. Accordingly, it is possible to print or store a region without the margin.

In a synthesized image, regions occupied by N-number of images can be generated and stored in angular representation. In other words, a region $S_k$ occupied by an image k is stored as ($\theta_{min}$, $\phi_{min}$, $\theta_{max}$, $\phi_{max}$) in a memory (not shown) or the like.

The mapping mode changing unit 108 arbitrarily changes the mapping mode for mapping a synthesized image. A basic mapping mode is automatically set by the mapping mode setting unit 110. The user is permitted to arbitrarily change the mapping mode to a desired mapping mode after confirming the generated synthesized image.

The operation of the mapping mode changing unit 108 is described.

Figure 14:
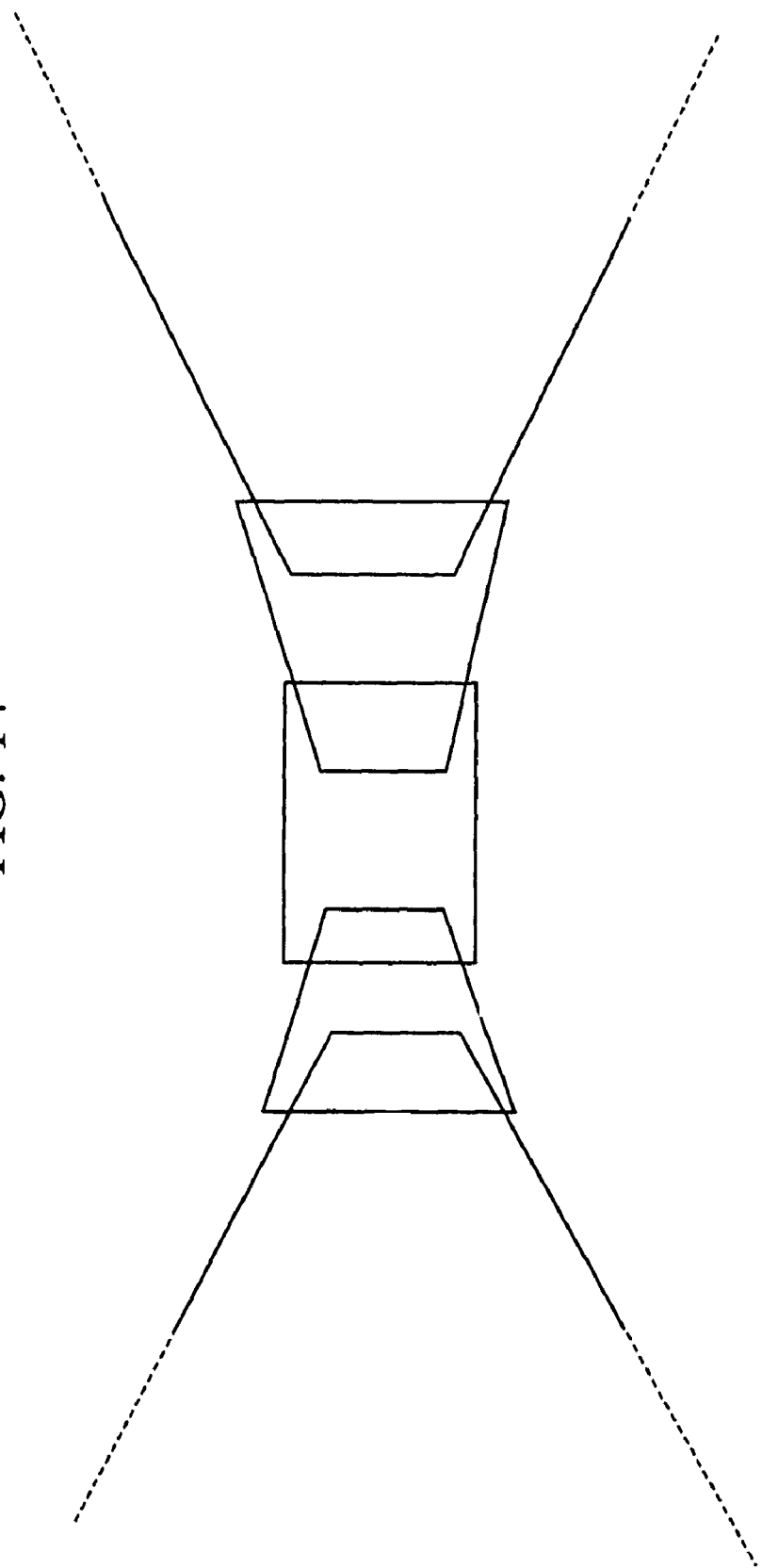
FIG. 14 is a schematic illustration of changing the image synthesized by the vertical-cylinder mapping to a planar mapping image.

FIG. 14 illustrates a case in which the image synthesized by the vertical-cylinder mapping as shown in FIG. 13A is transformed by the planar mapping mode. Referring to FIG. 14, the larger the viewing angle, the more extended the image transformed by the planar mapping mode will be. Theoretically, the viewing angle ranges from −90 deg. to +90 deg. The actual range is narrower than the theoretical range. Therefore, the mapping mode changing unit 108 presets the range of the displayable viewing angle in accordance with the type of mapping mode to be changed. When changing the mapping mode, the mapping changing unit 108 refers to the region $S_k$ occupied by each of the images generated by the image synthesis processor 109 among the entire image region. When the region $S_k$ exceeds the predetermined displayable region of the viewing angle set in accordance with the mapping type, a warning is issued, and only the synthesized image within the predetermined range of the viewing angle is generated and displayed. Accordingly, when the user inappropriately changes the mapping mode, the user is warned of the incorrect operation and obtains the synthesized image.

Figure 15:
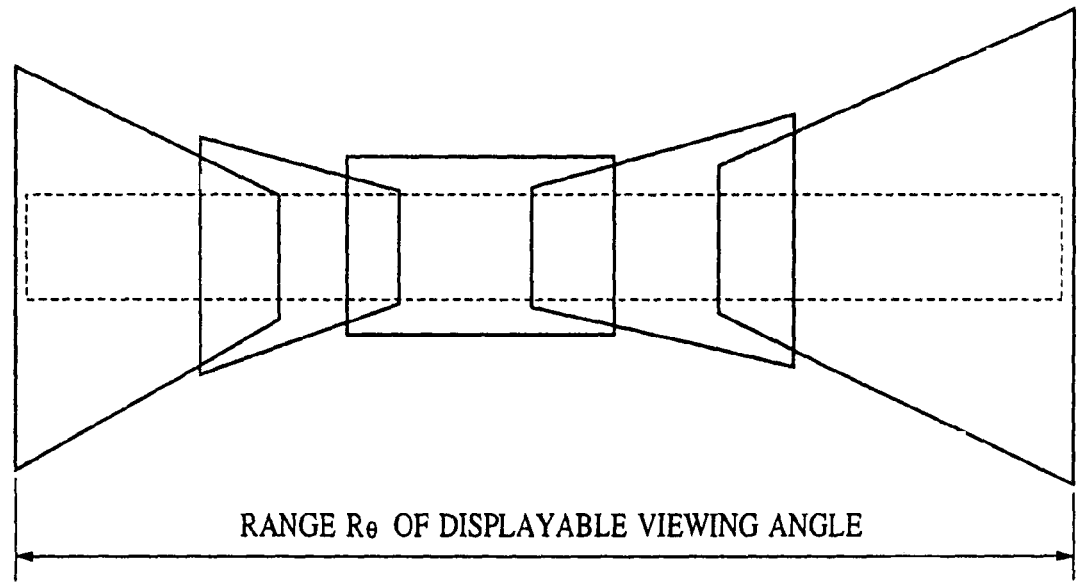
FIG. 15 is a schematic illustration of a synthesized image within a displayable range.

FIG. 15 schematically shows an image obtained by changing to the planar mapping mode by the mapping mode changing unit 108. Only the synthesized image within the range of the displayable viewing angle $R_\theta$ is generated. At the same time, the image region not including the margin is computed again and is indicated by the dotted lines.

A synthesized image displaying unit 105 displays the size of the synthesized image, which is used as the image information, not only in the pixel units, but also in the angle units. FIG. 16 shows the displayed image information. The user sets the image range to be stored using an input unit 111 in the pixel units or in the angle units. The set image range is indicated by dotted lines on the synthesized image displayed on the synthesized image displaying unit 105.

In accordance with the set image range, the synthesized image storage unit 107 records and stores the synthesized image in a recording medium 121 or the like. It is also possible to convert the size of the image with an arbitrary scale when the synthesized image is stored.

A panoramic image synthesis method and apparatus according to a third embodiment of the present invention restrict the number of mapping modes to be selected to two, i.e., the planar mapping mode and the vertical-cylinder mapping mode. The restriction on the types of mapping modes reduces the processing load.

Figure 17:
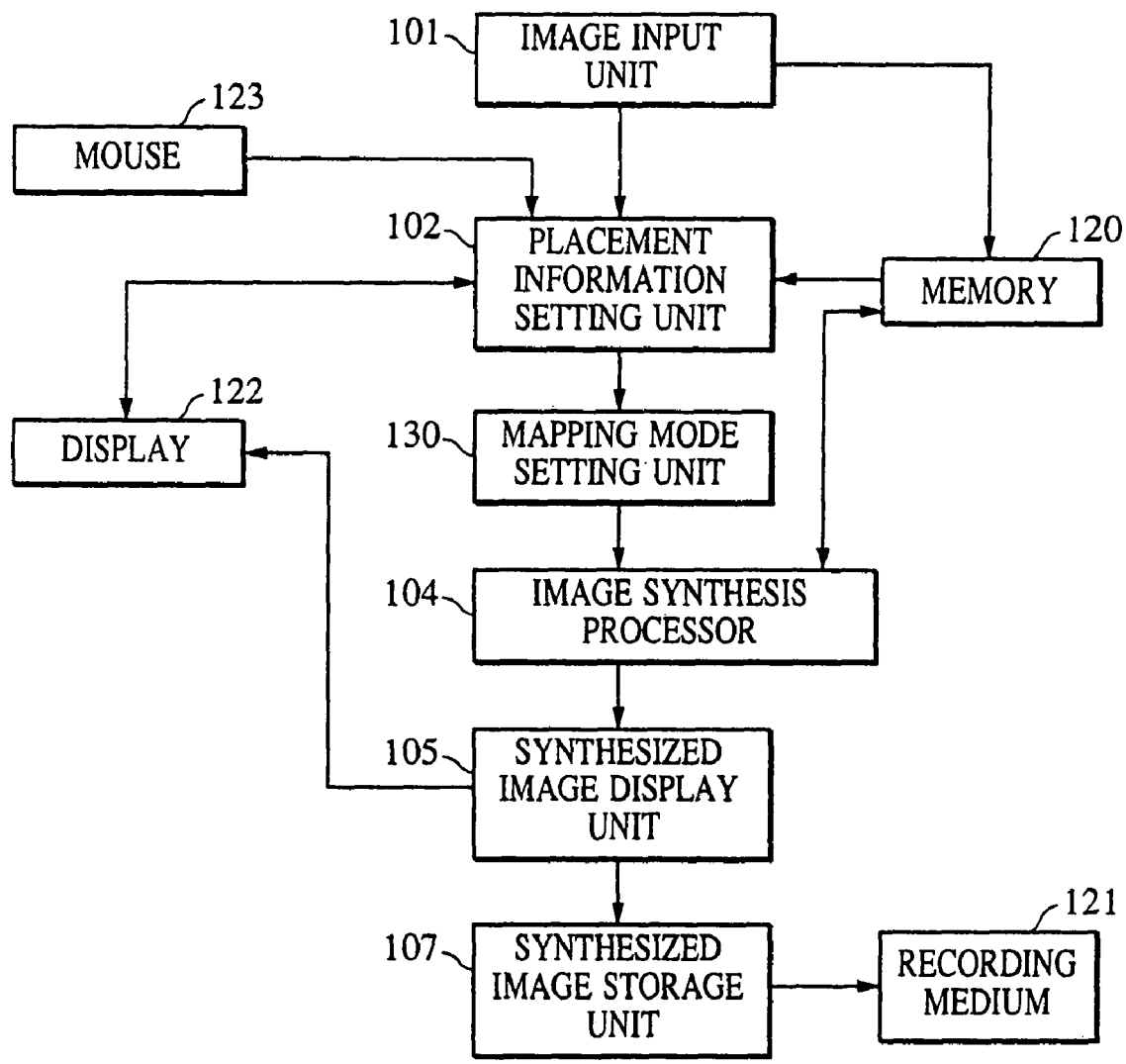
FIG. 17 is a block diagram of a panoramic image synthesis method and apparatus according to a third embodiment of the present invention.

FIG. 17 shows the panoramic image synthesis method and apparatus of the third embodiment. Since the available types of mapping modes are limited to the planar mapping mode and the vertical-cylinder mapping mode in the third embodiment, a mapping mode setting unit 130 differs from those in the other embodiments. The operation of the mapping mode setting unit 130 is described.

The mapping mode setting unit 130 computes the number of images in the horizontal direction and the vertical direction based on placement information set by a placement information setting unit 102. When there are m number of images in the horizontal direction and n number of images in the vertical direction, the values m and n are compared with preset reference values $T_m$ and $T_n$ of the numbers in the horizontal and vertical directions. Based on the comparison result, the mapping mode is set as below. When $m \leq T_m$ and $n \leq T_n$, the planar mapping mode is set. Otherwise, the vertical-cylinder mapping mode is set. Specifically, when the numbers of images are small, it is expected that the viewing angles of the image are not so large. In other words, it is expected that the peripheral portions of the image are not so distorted. Hence, when the numbers of images are equal to or less than the corresponding reference values, the planar mapping mode is selected. When the numbers of images exceed the corresponding reference values, it is highly possible that the image becomes deteriorated due to the distortion. Hence, the vertical-cylinder mapping mode is selected.

When the vertical-cylinder mapping mode is selected, it performs the coordinate transformation in the vertical direction in the same manner as the planar mapping mode. The larger the viewing angle of the synthesized image in the vertical direction, the more the peripheral portion becomes deteriorated, failing to generate a satisfactory image. To avoid this, as described in the second embodiment, the reference values of the displayable viewing angle are set in advance, and the synthesized image within these reference values is generated.

In the above example, only the placement information is used to set the mapping mode. Alternatively, it is possible to obtain focal length f using an obtaining unit (not shown). When $m \leq T_m$, $n \leq T_n$, and $f \geq T_f$, the planar mapping mode is set. Otherwise, the vertical-cylinder mapping mode is set.

Although a combination of the planar mapping mode and the vertical-cylinder mapping mode is used in this example, the combination can be formed of other mapping modes. For example, when $m \geq T_m$ and $n \leq T_n$, the vertical-cylinder mapping mode is set. When $m \leq T_m$ and $n \geq T_n$, the horizontal-cylinder mapping mode is set. Also, it is possible to add the planar mapping mode to the mapping modes used in the first and second embodiments, and the planar mapping mode can be included in the above combination. Accordingly, the mapping mode can be set by simple computation processing using the horizontal and vertical numbers of images as the placement information.

A panoramic image synthesis method according to a fourth embodiment of the present invention includes a step of computing the relationship between coordinate spaces of input images irrespective of the mapping mode, and separately, a transforming step using coordinate transformation parameters which differ in accordance with the mapping mode. When synthesizing an image, the two separate steps are combined so as to synthesize the image in which the mapping mode is changeable. Hence, the mapping mode can be changed by changing over the coordinate transformation parameters stored in association with the mapping mode, thereby easily obtaining synthesized images in various mapping modes.

Figure 19:
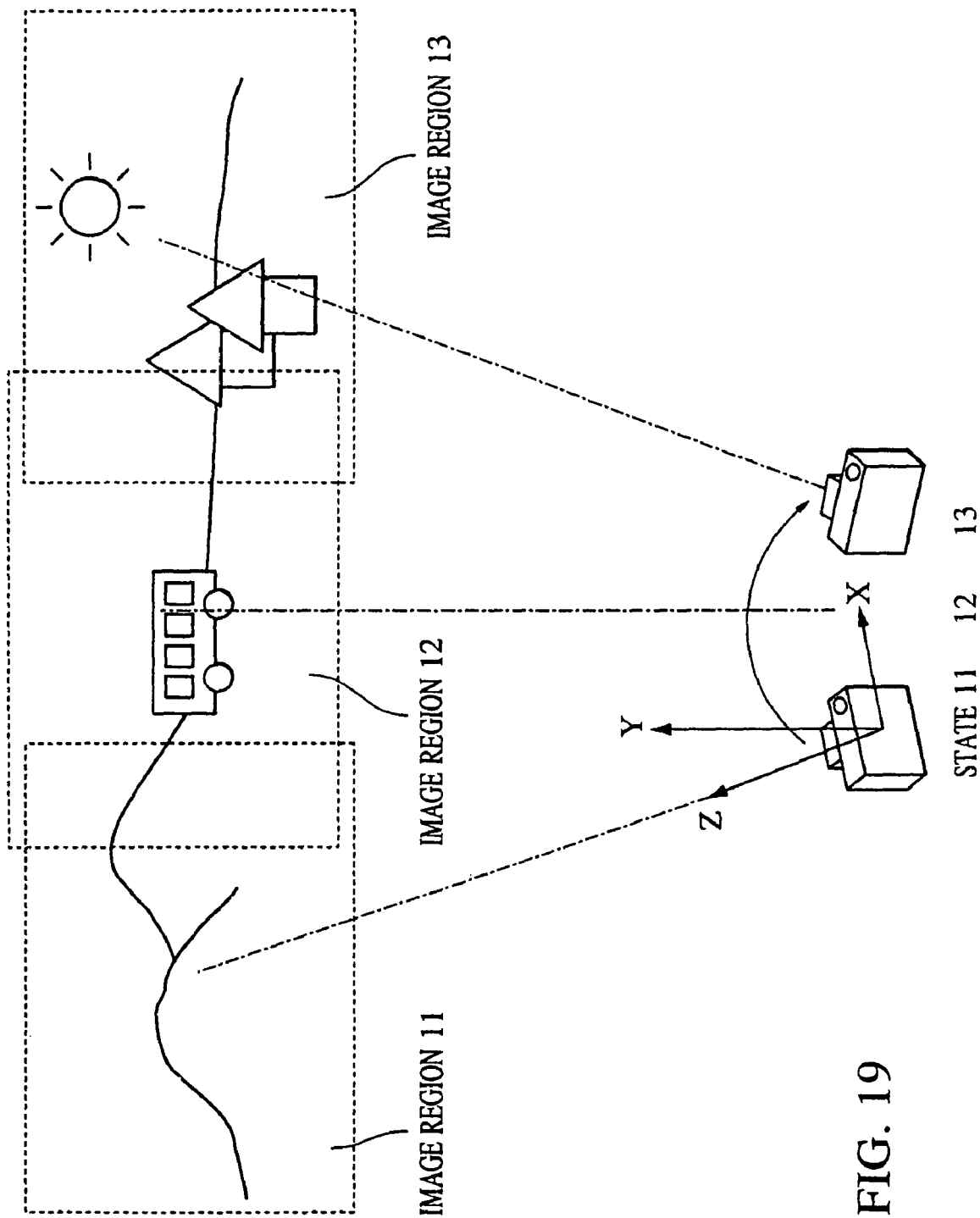
FIG. 19 is a schematic illustration of panoramic image capturing.

Referring to FIG. 19, images to be used by the panoramic image synthesis method and apparatus of the fourth embodiment are captured by an image capturing person who inputs an image in an image region 11 at a state 11 while rotating at an arbitrary position, an image in an image region 12 at a state 12, and an image in an image region 13 at a state 13.

The rotating direction includes the Y-axis rotation (hereinafter referred to as "panning") or the X-axis rotation (hereinafter referred to as "tilting"), as shown in FIG. 19. Referring to FIG. 19, the images are input and combined into a panoramic image which covers an arbitrary viewing angle.

Figure 20:
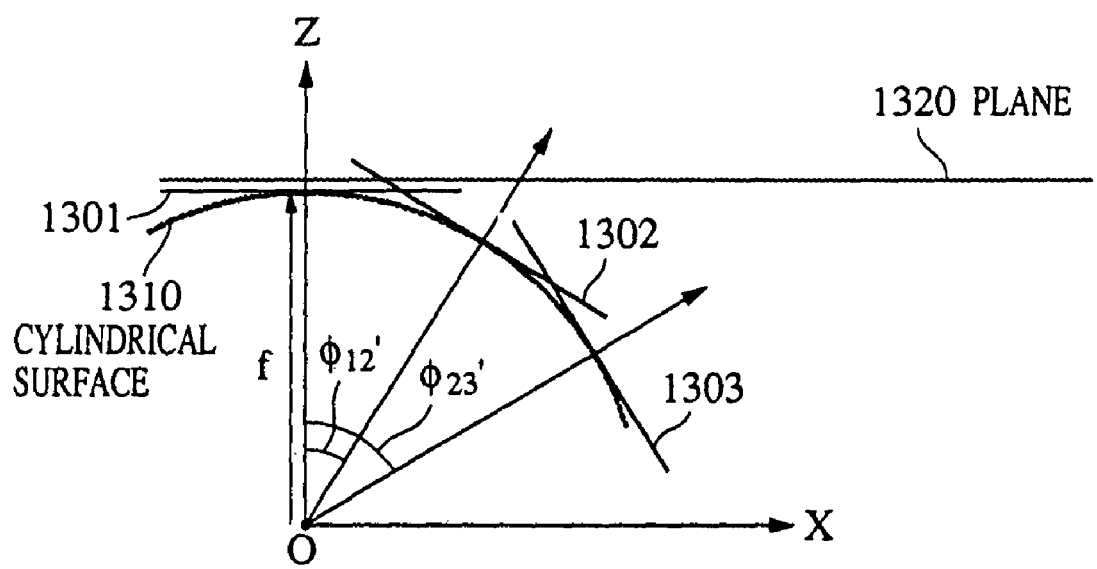
FIG. 20 is a schematic illustration of mapping transformation.

The relationship between the panoramic image and mapping is described. FIG. 20 is a sectional view of the illustration shown in FIG. 19 at the states 11 to 13 when Y is equal to zero. The origin O and the coordinate axes X, Y, and Z are set based on the state 11. Focal length is expressed by f, and values $\phi_{12}$, and $\phi_{23}$, express panning angles. There are sensor surfaces (image planes) 1301, 1302, and 1303.

In order to combine a plurality of images captured in different directions into a single image, it is necessary to map the images onto a single surface. This can be done by the cylinder mapping mode of projecting the images disposed on the sensor surfaces onto a cylindrical surface 1310 or by the planar mapping mode of projecting the images onto a plane 1320, as shown in FIG. 20.

Figure 21A:
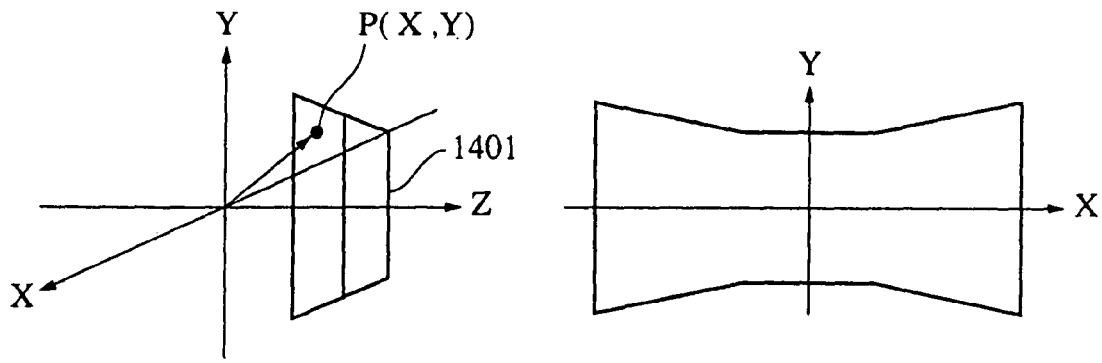
FIGS. 21A to 21C are illustrations of mapping modes.
Figure 21B:
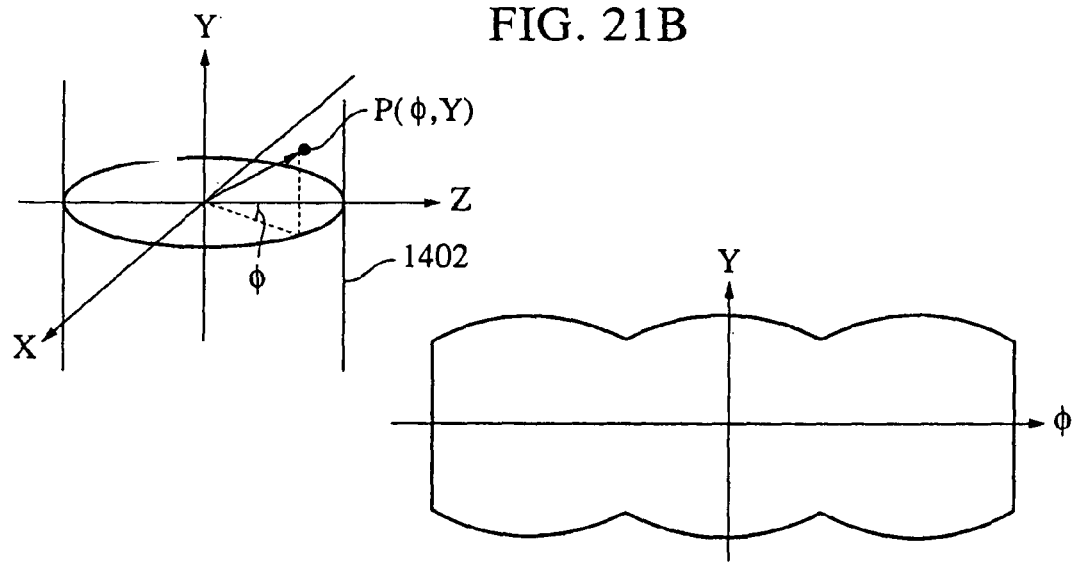
Figure 21C:
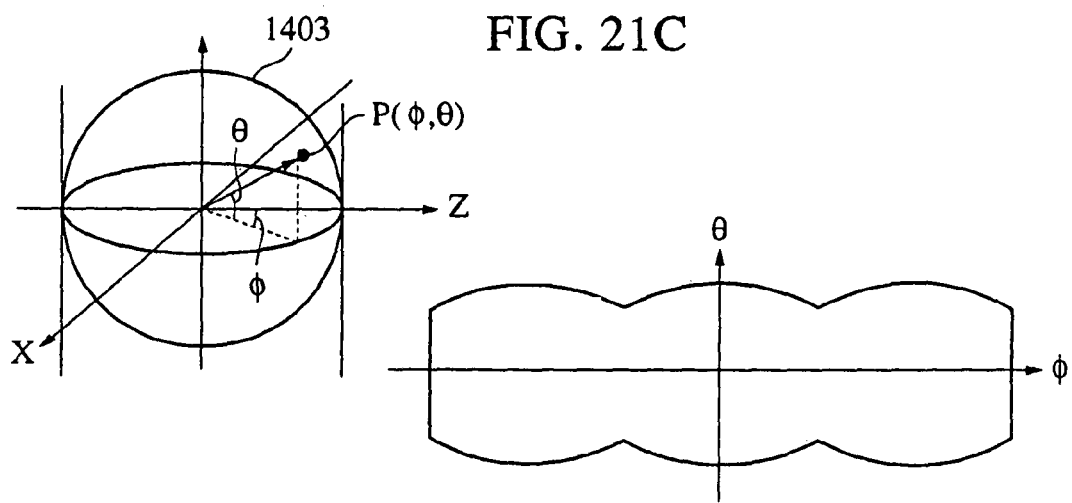

Referring to FIGS. 21A to 21C, the mapping modes are described.

FIG. 21A illustrates the planar mapping mode of projecting the images disposed on the sensor surfaces onto a plane 1401 around the origin O.

With the planar mapping mode, it is possible to generate a synthesized image which is similar to an image captured by a wide-angle lens. A straight-line portion of a subject is represented as a straight line in the synthesized image. The range of the displayable viewing angle is limited to below 180°. Even when the viewing angle is below 180°, the larger the viewing angle, the more the peripheral portion is distorted and deteriorated. Therefore, it is appropriate to set the viewing angle of the synthesized image to approximately 120°.

FIG. 21B illustrates the cylinder mapping mode. The images on the sensor surfaces are projected onto a cylinder 1402 with the center line passing through the origin O.

The horizontal direction of the image obtained by expanding the lateral side of the cylinder is expressed by an angle $\phi$, which can express the entire perimeter of 360°. In contrast, the vertical direction is the same as that in the planar mapping mode, and the displayable horizontal viewing angle is below 180°. As in the planar mapping mode, the larger the viewing angle, the more the peripheral portion is distorted and deteriorated. In the cylinder mapping mode, a straight-line portion of a subject is distorted in accordance with the position of the image.

In the cylinder mapping mode, two types of cylinders are used. One has the X-axis as the rotation axis, and the other has the Y-axis as the rotation axis. It is thus effective to select the rotation axis in accordance with the image capturing condition. When an image is captured by panning, a cylinder (vertical cylinder) rotating around the Y-axis is used. When an image is captured by tilting, a cylinder (horizontal cylinder) rotating around the X-axis is used.

FIG. 21C shows the spherical mapping mode of projecting images disposed on the sensor surfaces onto a spherical surface 1403 around the origin O.

In an image obtained by the spherical mapping mode, both the horizontal direction and the vertical direction are expressed by angles. Hence, it is possible to generate an all-around panoramic image. In the spherical mapping mode, a straight-line portion of a subject is distorted in accordance with the position of the image.

The spherical mapping mode is suitable for representing a synthesized image generated by combining panned images and tilted images.

Accordingly, there are various types of mapping modes for synthesizing an image. It is thus effective to select the mapping mode in accordance with the type of subject and the image capturing condition.

Figure 18:
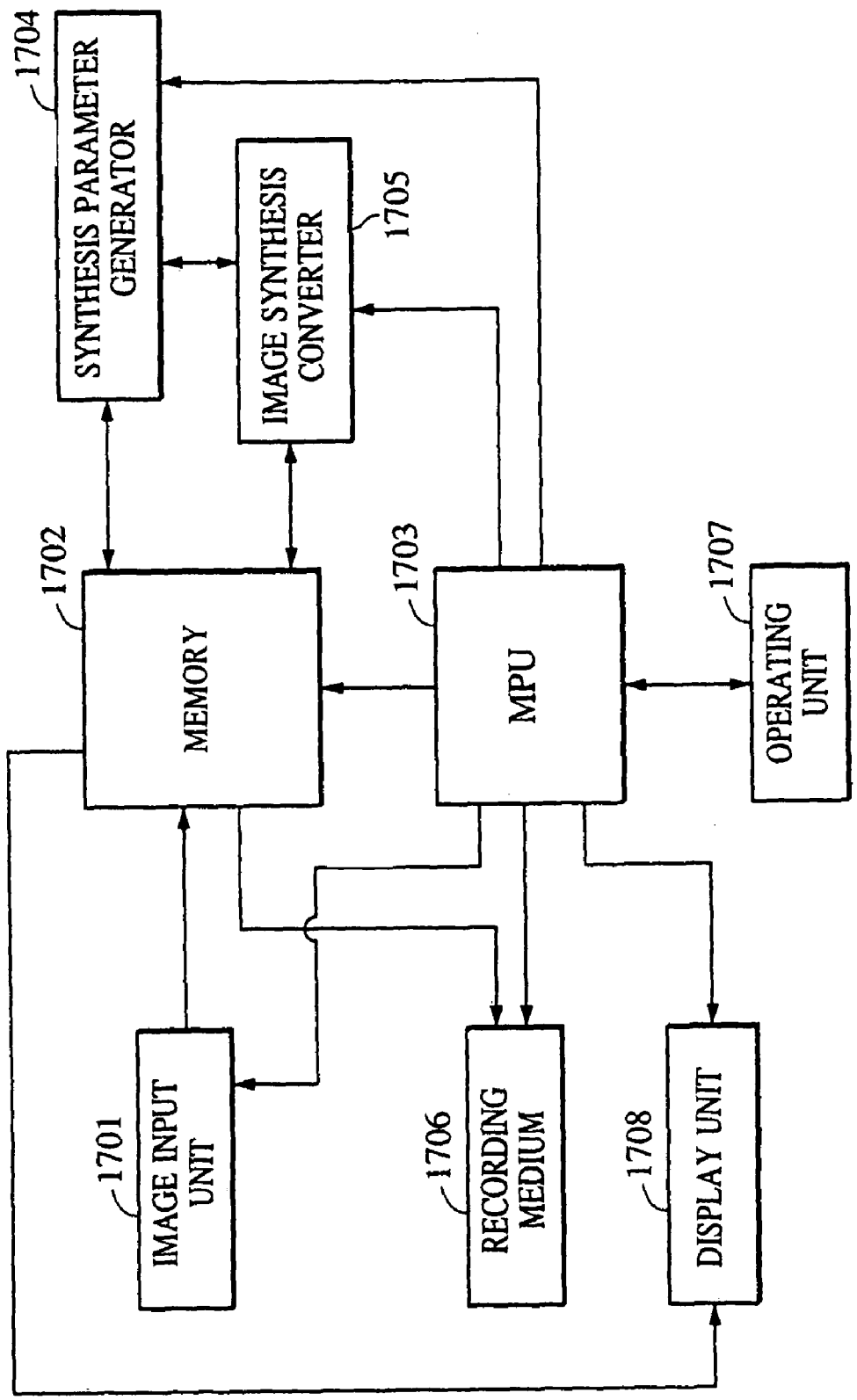
FIG. 18 is a block diagram of a panoramic image synthesis method and apparatus according to a fourth embodiment of the present invention.

FIG. 18 shows the panoramic image synthesis method and apparatus according to the fourth embodiment of the present invention.

Referring to FIG. 18, an image input unit 1701 inputs images to be used for image synthesis. The images can be input by reading images recorded in a recording medium (not shown). Alternatively, the images can be input from a memory (not shown). Video signals obtained from an imager, such as a digital camera, can be digitized and input as the input images.

A memory 1702 stores various, types of information, such as image information and parameters used for synthesis processing.

A microprocessing unit (MPU) 1703 controls the entire synthesis processing and performs various arithmetic processing.

A synthesis parameter generator 1704 generates coordinate-space transformation parameters indicating the positional relationship between adjacent images. The synthesis parameter generator 1704 also generates various synthesis parameters required for generating a synthesized image by computing gray-scale correction parameters and an adjoining position between adjacent images. Although the gray-scale correction parameters are computed in the embodiment, so-called color-matching parameters for matching brightness and chrominance between adjacent images may be computed. The synthesis parameter generator 1704 is connected to the memory 1702 and the MPU 1703. Information including image data and various synthesis parameters is input to and output from the memory 1702. Control information is input to and output from the MPU 1703.

An image synthesis converter 1705 combines a plurality of images-using the coordinate transformation parameters in accordance with the given mapping mode and the synthesis parameters including the coordinate-space transformation parameters generated by the synthesis parameter generator 1704. Specifically, the image synthesis converter 1705 gains access to the memory 1702 based on the control information from the MPU 1703 and reads the image data and the synthesis parameters including the coordinate-space, transformation parameters. The image synthesis converter 1705 then generates a synthesized image by performing coordinate transformation processing or the like. The obtained synthesized image is written to the memory 1702.

It is necessary to distinguish between the coordinate transformation parameters and the coordinate-space transformation parameters.

The coordinate transformation parameters are parameters set for each mapping mode.

In contrast, the coordinate-space transformation parameters are parameters indicating the relationship between a coordinate plane of one image and a coordinate plane of another image among a plurality of images.

A recording medium 1706 includes a floppy disk or the like. The recording medium 1706 records a synthesized panoramic image.

An operating unit 1707 is used to set focal length and to select the mapping mode. The specific operation can be performed with a GUI using a mouse or the like. Alternatively, commands can be directly input using a keyboard.

A display unit 1708 displays a panoramic synthesized image, a mapped/transformed image, GUI, and the like.

The operation of the panoramic image synthesis method and apparatus according to the fourth embodiment is described.

The image input unit 1701 inputs images in which adjacent images partially overlap with each other. The memory 1702 stores the input images. Images to be input can be selected from candidate images displayed on the display unit 1708 based on an instruction from the operating unit 1707. Alternatively, a single set of panoramic images can be automatically selected and input based on the attribute of an image file.

The operating unit 1707 sets image capturing focal length f of the images to be used for synthesis processing. The focal length f can be set by inputting a value of the focal length or by selecting a value from among a plurality of candidate values. When the image capturing focal length is preset as the attribute of an image stored in the memory, that value can be used as the focal length f.

When the image information and the image capturing focal length are set, the synthesis parameter generator 1704 generates the parameters used for combining the adjacent images.

Figure 22:
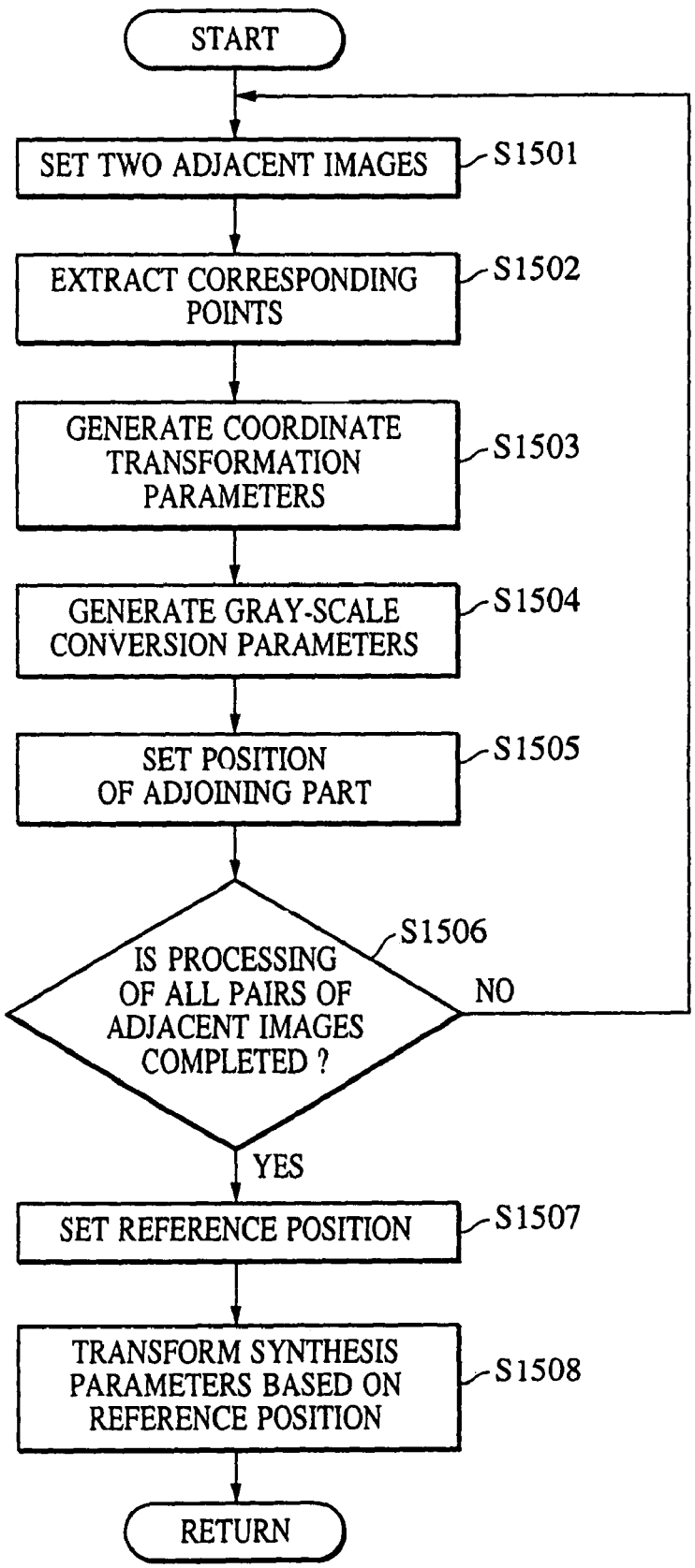
FIG. 22 is a flowchart showing a process for generating synthesis parameters.

FIG. 22 is a flowchart showing a process of generating the synthesis parameters.

In step S1501, two images to be used for setting the synthesis parameters are set. In step S1502, corresponding points in the overlapping region of the two set images are extracted. The corresponding points can be extracted by a conventional technique, such as the template matching method or the correlation method.

In order to enhance processing efficiency, it is advantageous to employ a conventional coarse-to-fine hierarchical method of extracting the corresponding points.

Figure 23:
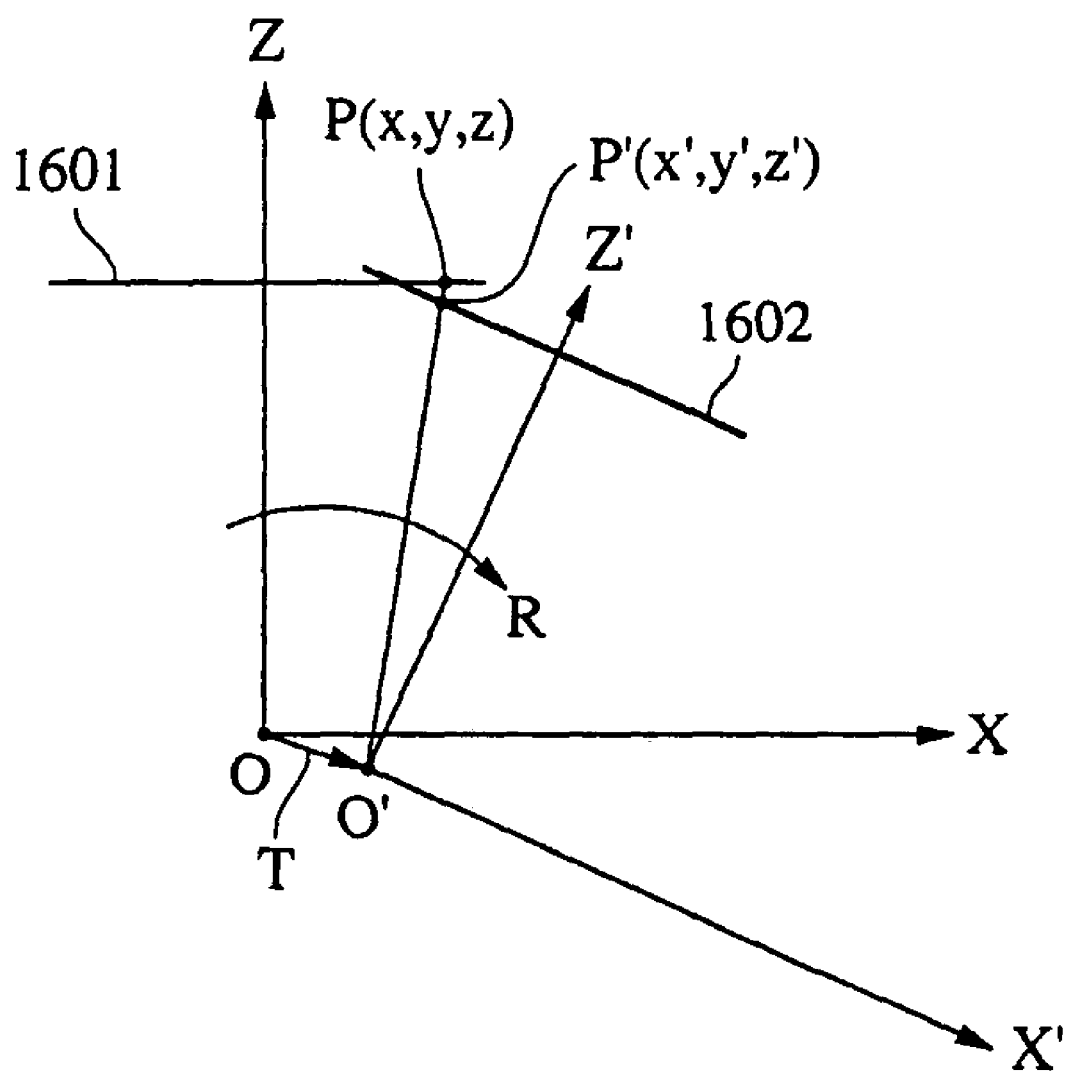
FIG. 23 is a schematic illustration of synthesis transformation processing.

In step S1502, the coordinate-space transformation parameters between the images are computed based on information about the extracted corresponding points. Referring to FIG. 23, an example of computing the coordinate-space transformation parameters is described.

FIG. 23 shows a sectional view taken through the XZ plane of the panned images shown in FIG. 19 in which Y is equal to zero. Sensor surfaces 1601 and 1602 correspond to the adjacent captured images. When the origin of the XYZ coordinate system corresponding to the sensor surface 1601 is expressed by O, and the origin of the X'Y'Z' coordinate system corresponding to the sensor surface 1602 is expressed by O', the coordinate-space transformation parameters indicate the relationship between the XYZ coordinate system and the X'Y'Z' coordinate system. When the corresponding points obtained by the corresponding point extraction processing in step S1501 are expressed by a point P and a point P', the relationship between the two points P and P' can be concluded as follows using a rotation parameter R and a translation parameter T shown in FIG. 23:

$$P' = R \cdot P + T \tag{5}$$

In the equation (5), R represents a rotation matrix obtained from rotational components ($\theta$, $\phi$, $\psi$) rotating around the axes, respectively. The rotation matrix R can be expressed as follows:

$$R = \begin{pmatrix} m_1 & m_2 & m_3 \\ m_4 & m_5 & m_6 \\ m_7 & m_8 & m_9 \end{pmatrix} \tag{6}$$

wherein $m_1$: $\cos(\phi)\cos(\phi)$ $m_2$: $-\sin(\phi)\cos(\theta) + \cos(\phi)\sin(\phi)\sin(\theta)$ $m_3$: $\sin(\phi)\sin(\theta) + \cos(\phi)\sin(\phi)\cos(\theta)$ $m_4$: $\sin(\phi)\cos(\phi)$ $m_5$: $\cos(\phi)\cos(\theta) + \sin(\phi)\sin(\phi)\sin(\theta)$ $m_6$: $-\cos(\phi)\sin(\theta) + \sin(\phi)\sin(\phi)\cos(\theta)$ $m_7$: $-\sin(\phi)$ $m_8$: $\cos(\phi)\sin(\theta)$ $m_9$: $\cos(\phi)\cos(\theta)$ A synthesized matrix M of the rotation matrix R and the translation matrix T is expressed as follows:

$$m = \begin{pmatrix} R & T \\ 0 & 1 \end{pmatrix} \tag{7}$$

The synthesized matrix M can be computed using a non-linear least-squares method or the like based on the information about the corresponding points obtained by the corresponding point extraction processing. It is also possible to use other conventional techniques to compute the parameters.

Accordingly, the computation of the relationship between the coordinate system XYZ and the coordinate system X'Y'Z' provides a clue to identify, for example, a point on the coordinate system X'Y'Z' that corresponds to a point P (x, y, z).

A specific example of this is given hereinafter. The synthesized matrix M is computed as the coordinate-space transformation parameters because the synthesized matrix M represents the corresponding relationship between the points on the images. In other words, the synthesized matrix M represents the positional relationship in space when the images are captured based on the arbitrarily input two-dimensional image information.

Therefore, it is only necessary to map the images onto an appropriate common surface, thus generating an appropriate synthesized image.

In step S1504, the process generates correction parameters for making the adjoining part between the adjacent images less noticeable by matching the gray scale of the adjacent images.

In step S1505, the position of the adjoining part between the adjacent images is set using the generated coordinate transformation parameters or the gray-scale correction parameters. The position of the adjoining part is set using a difference or a correlation value between pixels re-sampled based on the coordinate-space transformation parameters.

In step S1506, it is determined whether the generation of the parameters between all pairs of adjacent images is completed. If the determination is negative, two images to be combined are again set in step S1501, and the synthesis processing is continued.

If the determination is affirmative, a reference position to be used when combining all images is set in step S1507.

In step S1508, the already-obtained coordinate-space transformation parameters are transformed based on the set reference position.

Accordingly, the synthesis parameters are generated by the synthesis parameter generator 1704 shown in FIG. 18. The synthesis parameters are stored in the memory 1702.

Figure 24A:
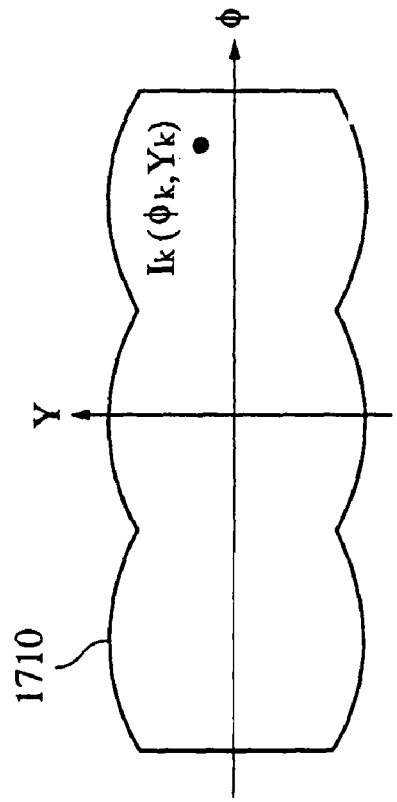
FIGS. 24A and 24B are illustrations of image synthesis.
Figure 24B:
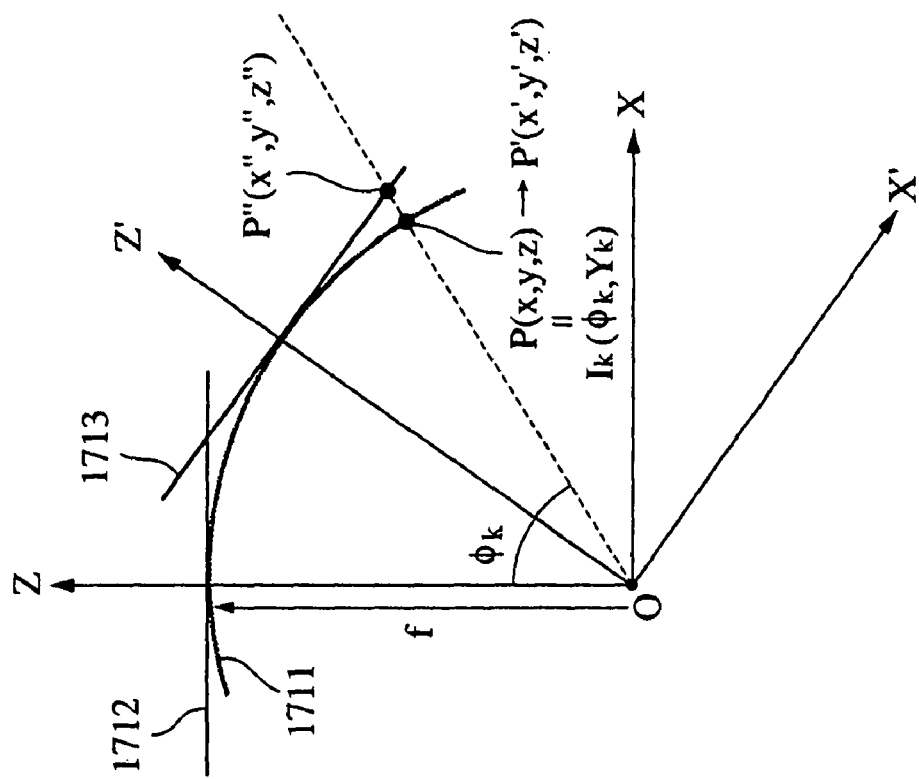

When the synthesis parameters are generated, a panoramic synthesized image is generated in a mapping mode selected by the image synthesis converter 1705. Referring to FIGS. 24A and 24B, processing performed by the image synthesis converter 1705 is described.

FIGS. 24A and 24B illustrate a case in which a synthesized image is generated by the cylinder mapping transformation. FIG. 24A shows a panoramic synthesized image 1710 obtained by the cylinder mapping. The processing performed by the image synthesis converter 1705 is described using an example of generating a pixel $I_k$ on the synthesized image 1710. FIG. 24B schematically shows the relationship between sensor surfaces 1712 and 1713 at image capturing positions. A cylindrical surface 1711 shows a sectional view taken through $Y=Y_k$ of the synthesized image 1710. In order to make the description simple, the above translation component T is omitted in FIG. 24B.

Referring to FIG. 24B, the coordinates of the point $I_k$ ($\phi_k$, $Y_k$) on the cylindrical surface 1711 are transformed into a point P (x, y, z) on the XYZ coordinate system. This coordinate transformation is expressed as follows:

$$x = f \cdot \sin(\phi_k)$$

$$y = Y_k$$

$$z = f \cdot \cos(\phi_k) \qquad (8)$$

When the point P is represented as a point P' (x', y', z') on the X'Y'Z' coordinate system, the coordinate transformation between the point P and the point P' is performed using a coordinate-space transformation parameter M of the equations (8) generated by the synthesis parameter generator 1704. The coordinate-space transformation parameter M is expressed as follows:

$$\begin{pmatrix} x' \\ y' \\ z' \\ 1 \end{pmatrix} = M \begin{pmatrix} x \\ y \\ z \\ 1 \end{pmatrix} \qquad (9)$$

Next, coordinates of a point P" on the sensor surface 1713 corresponding to the point P' are obtained by the following equations:

$$x'' = f \cdot \frac{x'}{z'} \qquad (10)$$

$$y'' = f \cdot \frac{y'}{z'}$$

$$z'' = f$$

Reference to a pixel at the coordinates (x", y") on the sensor surface 1713 (z"=f) is made using the equations (10), thus obtaining the value of the pixel $I_k$ on the synthesized image 1710.

The above processing is performed for each pixel on the synthesized image 1710, thus generating the synthesized image which is cylinder-mapped and transformed.

The synthesized image is stored in the memory 1702 and is displayed on the display unit 1708. As circumstances demand, the image is recorded in the recording medium 1706.

Changing processing for changing the mapping mode is described.

The user employs the operating unit 1707 to select an arbitrary mapping mode and to instruct the mapping mode to be changed. The MPU 1703 sets coordinate transformation processing in accordance with the selected mapping mode. The image synthesis converter 1705 performs the image conversion processing, as described above.

When the mapping mode is changed, the coordinate transformation processing using the equations (8) is replaced with new one corresponding to the newly selected mapping mode.

For example, when the mapping mode is changed to the planar mapping mode, each pixel on a synthesized image corresponds to the coordinates on a sensor surface. Hence, the coordinate transformation equations (8) corresponding to the pixel $I_k$ ($X_k$, $Y_k$) to be generated are as follows:

$$x = X_k$$

$$y = Y_k$$

$$z = f \qquad (11)$$

When the mapping mode is changed to the spherical mapping mode, sampling is performed so that both the horizontal direction and the vertical direction provide isogonal pitches. The coordinate transformation corresponding to the pixel $I_k$ ($\phi_k$, $\theta_k$) is performed by the following equations:

$$x = f \cdot \cos(\theta_k) \sin(\phi_k)$$

$$y = f \cdot \cos(\theta_k)$$

$$z = f \cdot \cos(\theta_k) \cos(\phi_k) \qquad (12)$$

The coordinate-space transformation parameter M representing the relationship between the images is the same for all mapping modes. The coordinate transformation equations are changed among the equations (8), (11), and (12) in accordance with the type of selected mapping mode. Accordingly, it is possible to generate a synthesized image in an arbitrary mapping mode.

Whenever the mapping mode is changed, a conventional image synthesis method substitutes the coordinates of the corresponding points for the equations based on the mapping mode, and generates the synthesis parameters. Based on the synthesis parameters, the coordinates of all pixels are transformed.

In contrast, the panoramic image synthesis method of the fourth embodiment performs the synthesis processing by first obtaining the corresponding relationship between the points on the images as the coordinate-space transformation parameters, and subsequently changing the coordinate transformation processing in accordance with the mapping mode. Therefore, when the mapping mode is changed, it is only necessary to map and transform the input images using the already-obtained coordinate-space transformation parameters and the coordinate transformation processing. In other words, it is not necessary to again compute the parameters. Hence, the panoramic image synthesis method of the fourth embodiment can generate synthesized images in various mapping modes in an extremely efficient manner. In particular, the method can substantially reduce the processing time when the mapping mode is changed. At the same time, the method can generate a synthesized image of excellent quality because the method does not transform a synthesized image.

A panoramic image synthesis method and apparatus according to a fifth embodiment of the present invention have the following characteristics:

1) A user can arbitrarily change a reference position, and a synthesized image can be converted based on the changed reference position.

2) An adjoining part can be corrected.

3) A synthesized image can be restored to a previous synthesis result.

The operation of the panoramic image synthesis method and apparatus of the fifth embodiment is described. The overall structure of the fifth embodiment is the same as that shown in FIG. 18. The panoramic image synthesis method and apparatus of the fifth embodiment operate in a manner similar to those of the first embodiment up to the point at which a synthesized image is generated in a predetermined mapping mode and is displayed on a display unit. Hence, the description of the common parts is omitted.

Referring to FIGS. 25A, 25B, 26A, and 26B, processing for changing a reference position according to the fifth embodiment is described. FIG. 25A shows a case in which a synthesis result is displayed by planar mapping. A synthesized image 1801 shown in FIG. 25A is obtained by combining images provided by capturing a building by vertical tilting. The synthesized image 1801 is reduced in size at the top and has a trapezoidal shape. The synthesized image 1801 has a reference position 1802.

FIG. 25B shows the relationship between a subject building 1803 and sensor surfaces 1804 and 1806 at different states in which the subject building 1803 is captured by tilting. A projection surface 1807 displays a synthesized image with a reference position 1808 of the synthesized image.

In order to change the reference position, the reference position 1802 shown in FIG. 25A is moved by the operating unit 1707 shown in FIG. 18, such as a mouse or the like. Alternatively, the reference position can be moved by an instruction from a keyboard, which designates the coordinates of a destination, or by an arrow key or the like.

The changed position is sent to an MPU 1703. The MPU 1703 outputs movement information to an image synthesis converter 1705. The image synthesis converter 1705 generates a correction matrix M' for correcting the synthesized image based on the movement information.

The image synthesis converter 1705 corrects the coordinate-space transformation parameters M of all the images using the correction matrix M', thus generating a synthesis conversion matrix M2:

$$M2 = M \cdot M' \qquad (13)$$

Subsequently, the synthesized image is generated in a selected mapping mode as in the first embodiment. The synthesized image is stored in a memory 1702 and is displayed on a display unit 1708.

FIG. 26A shows a result of moving the reference position and converting the synthesized image. A resultant synthesized image 1901 has a current reference position 1902.

FIG. 26B shows the relationship between the subject and the sensor surfaces.

The reference position is moved to a reference position 1908. A projection surface 1907 on which the synthesized image is projected is set based on the reference position 1908. Using the projection surface 1907, the synthesized image is generated.

Since the projection surface 1907 is parallel to a lateral side of the subject, an undistorted synthesized image 1901 can be generated.

There are conventional methods and apparatuses for arbitrarily setting a reference plane corresponding to the projection surfaces 1807 and 1907 and forming a synthesized image on the reference plane. However, these conventional methods and apparatuses are not advantageous since they must re-compute synthesis parameters from the beginning whenever the reference plane is changed.

The panoramic image synthesis method and apparatus of the fifth embodiment are required to only apply the coordinate space changing parameters corresponding to the reference position to the already-computed coordinate-space transformation parameters and to perform computation. Accordingly, usability is significantly increased. The user is capable of setting the reference position at a desired position when generating the synthesized image. This flexibly complies with geometrical correction, such as tilting and shifting correction.

Figure 27A:
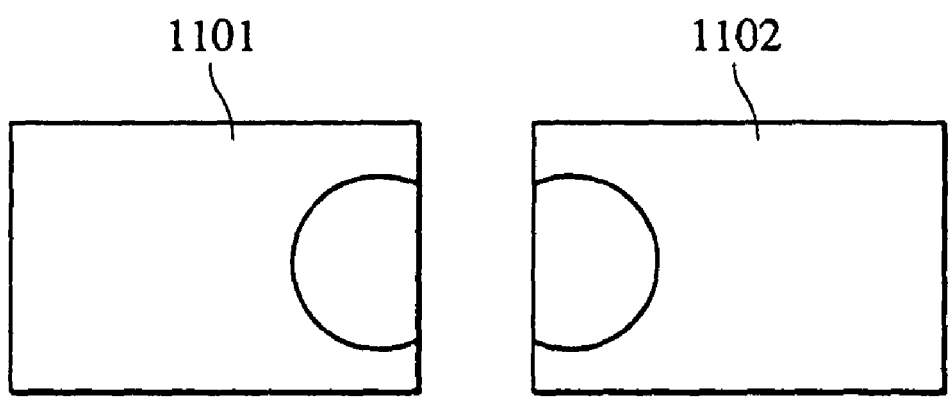
FIGS. 27A and 27B are schematic illustrations of captured images in which an adjoining part is corrected.
Figure 27B:
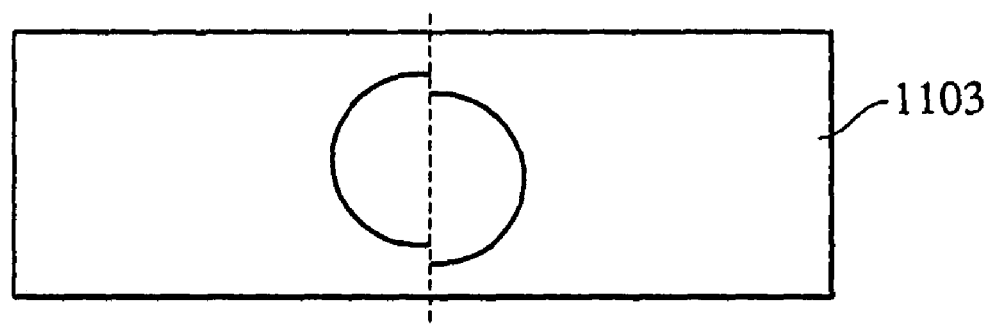

Next, correction processing of an adjoining part is described. FIG. 27A shows images 1101 and 1102 captured so as to partially overlap with each other. FIG. 27B shows a synthesized image 1103 of the images 1101 and 1102. An adjoining part of the synthesized image 1103 is indicated by dotted lines.

The synthesized image 1103 is out of alignment at portions near the adjoining part. When a synthesized image is not aligned, the panoramic image synthesis method and apparatus of the fifth embodiment correct the alignment, as shown in FIGS. 28A and 28B.

Figure 28A:
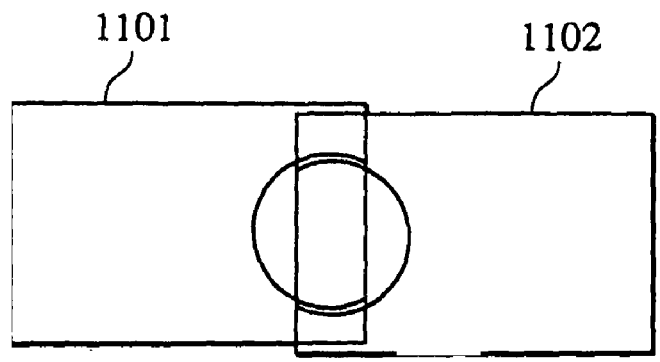
FIGS. 28A to 28C are schematic illustrations of correction processing.

Referring to FIG. 28A, the two captured images 1101 and 1102 are moved by the operating unit 1707 shown in FIG. 18, and the overlapping portions of the two images 1101 and 1102 are aligned so as to substantially correspond with each other. The alignment information is sent to the MPU 1703. The MPU 1703 outputs the alignment information to a synthesis parameter generator 1704, and the synthesis parameter generator 1704 uses the information for extracting the corresponding points.

The synthesis parameter generator 1704 can extract the corresponding points in a state in which the overlapping portions are aligned to a certain degree. Therefore, extraction accuracy and reliability are improved.

Figure 28B:
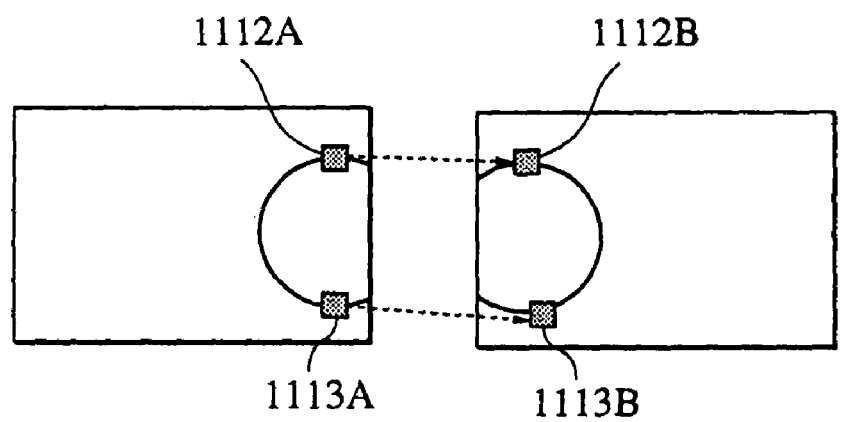

Referring to FIG. 28B, points on the subject on the images 1101 and 1102 are directly set as the corresponding points by the operating unit 1707 shown in FIG. 18. A pair of points 1112A and 1112B, and a pair of points 1113A and 1113B are set as pairs of corresponding points.

The MPU 1703 obtains information about the pairs of corresponding points, and sends the information to the synthesis parameter generator 1704.

The synthesis parameter generator 1704 uses the information about the pairs of corresponding points to estimate the coordinate-space transformation parameters. Since the obtained pairs of corresponding points are aligned by manual operation, it is possible to increase accuracy in the pairs of corresponding points by performing the template matching method or the correlation method in the vicinity of the pairs of corresponding points, and to use the information about the more accurate corresponding points to estimate the coordinate-space transformation parameters.

Figure 28C:
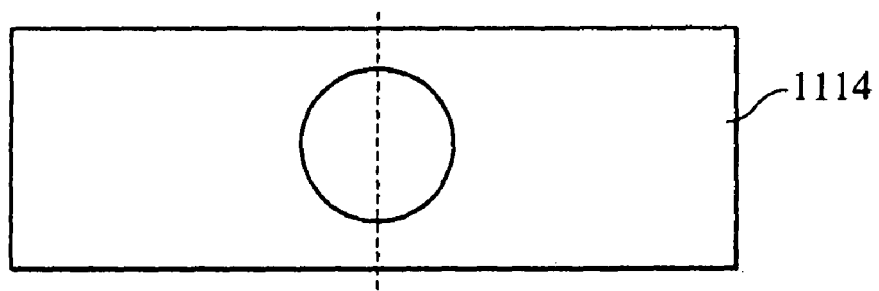

FIG. 28C shows a corrected synthesized image 1114. When compared with the image 1103, the synthesized image 1114 has a smooth adjoining part. This correction processing can be repeated until the user is satisfied with the result.

When the resultant image obtained by changing the mapping mode and correcting the adjoining part is satisfactory, there is no problem. However, there are cases in which the previous image is more satisfactory than the resultant image. In order to solve this problem, the panoramic image synthesis method and apparatus of the fifth embodiment store the synthesis parameters and the image information about the synthesis results in a memory 1702 whenever a synthesized image is generated until a series of image synthesis processing steps is completed.

For example, the synthesis result 1103 shown in FIG. 27B is set as a first synthesis result in which synthesis counters are set such that Cs1=1 and Cs2=1. At the same time, the various synthesis parameters and the synthesized image are stored at the memory position corresponding to the synthesis counters Cs1=1 and Cs2=1. The synthesis counter Cs1 is a counter incremented by one whenever changing/correction processing is performed. The synthesis counter Cs2 is a counter incremented by one whenever the current state returns a one-step previous state and changing/correction processing is again performed in that previous state.

When the synthesized image 1114 is obtained by the changing/correction processing, the synthesis counters are set such that Cs1=2 and Cs2=1, and the synthesis parameters and the synthesized image are stored at the memory position corresponding to the synthesis counters Cs1=2 and Cs2=1.

Figure 29:
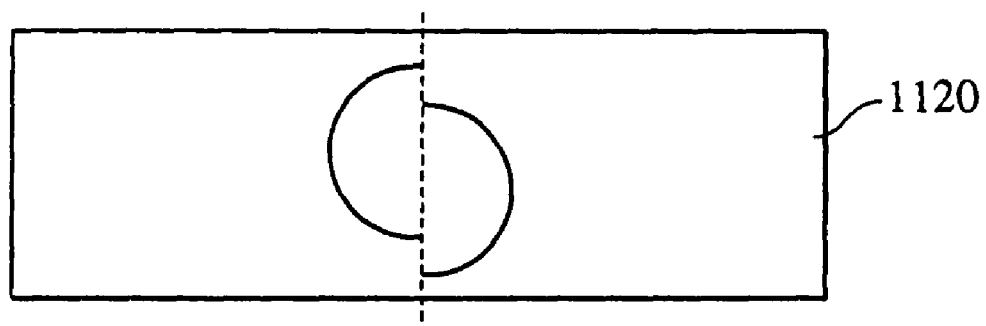
FIG. 29 is a schematic illustration of a synthesized image obtained by changing/correction processing.

When a synthesized image 1120 shown in FIG. 29 is obtained by the changing/correction processing, the synthesis counters are set such that Cs1=3 and Cs2=1, and the synthesis parameters and the synthesized image are stored at the memory position corresponding to the synthesis counters Cs1=3 and Cs2=1.

When the user gives an "undo" instruction by the operating unit 1707, the synthesis counter Cs1 is decreased by one to be Cs1=2. The synthesis parameters and the synthesis resultant image corresponding to the synthesis counters Cs1=2 and Cs2=1 are read from the memory 1702. The synthesized image is displayed on the display unit 1708. The read parameters are replaced with the current parameters.

Figure 30:
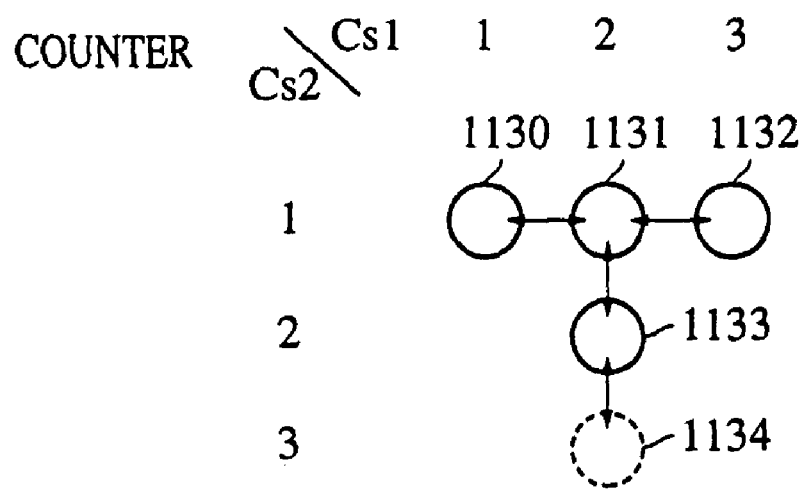
FIG. 30 is a schematic illustration of the changing/correction processing sequence.

At this point, a synthesized image 1131 shown in FIG. 30 is displayed. When changing/correction processing is performed, the Cs1 counters are incremented by one, thus setting Cs1=2 and Cs2=2. The synthesis parameters and the synthesized image are stored at the memory position corresponding to the synthesis counters Cs1=2 and Cs2=2. In this state, a synthesized image 1133 shown in FIG. 30 is provided.

When further correction is performed, a synthesized image 1134 is displayed, and the synthesis counters become Cs1=2 and Cs2=3.

The above processing is performed by the MPU 1703 and the memory 1702. Since all images generated whenever changing/correction processing is performed are stored in the memory 1702, the user can easily restore the image to a previously-generated arbitrary image.

The operating unit 1707 indicates the "undo" directions using a left arrow and a right arrow.

Alternatively, any conventional technique can be used to designate the direction.

For example, the values of the counters Cs1 and Cs2 can be input, thereby restoring the image to a previously-generated arbitrary image.

In the above example, the synthesis parameters and the synthesized images are stored. When the synthesized images are large in size or the number of the synthesized images is large, these data may impose a burden on the memory capacity. In such a case, it is effective to store only the synthesis parameters and to sequentially generate an image using the synthesis parameters.

According to the panoramic image synthesis method and apparatus of the fifth embodiment, correction of a synthesized image, such as tilting and shifting correction, is performed in a flexible and efficient manner.

The above embodiments can be applied to a system including a plurality of apparatuses, such as a host computer, an interface device, a reader, and a printer. Alternatively, these embodiments can be applied to an apparatus including a single device, such as a copying machine or a facsimile machine.

The present invention covers the following case. In order to perform the functions of the above embodiments, a computer in an apparatus or a system connected to various devices so as to operate the devices is provided with software program codes for executing the functions. The computer (CPU or MPU) in the system or the apparatus operates the various devices in accordance with the stored program.

In this case, the software program codes execute the functions of the above embodiments. The present invention covers the program codes and a medium for supplying the computer with the program codes, such as a storage medium for storing the program code.

The storage medium for storing the program code includes a floppy disk, a hard disk, an optical disk, a magneto-optical disk, a CD-ROM, a magnetic tape, a non-volatile memory card, or a ROM.

The present invention is not limited to a case in which the functions of the embodiments are performed by executing the supplied program codes by the computer. It also covers a case in which the program codes perform the above functions in cooperation with an operating system (OS) running in the computer or with other application software.

The present invention also covers the following case. After the program codes are stored in a memory of an add-on board of the computer or an add-on unit connected to the computer, a CPU of the add-on board or the add-on unit performs part or entirety of the actual processing based on instructions from the program codes, thereby performing the functions of the above embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image synthesis apparatus comprising:
   an image input unit configured to input a plurality of images;
   an extracting unit configured to extract a plurality of corresponding points within an overlapping area of adjacent images input by said image inputting unit;
   a parameter generating unit configured to generate a coordinate-space parameter indicating a positional relationship between adjacent images input by said image input unit on the basis of the extracted corresponding point;
   a storing unit configured to store the coordinate-space parameter generated by said parameter generating unit in a memory;
   a selecting unit configured to select a mapping mode from among a plurality of mapping modes in response to a user instruction;
   an image synthesizing unit configured to synthesize the plurality of images into a synthetic image using a coordinate transformation equation corresponding to the mapping mode selected by said selecting unit and the coordinate-space parameter previously stored in the memory and read out from the memory;
   a recording unit configured to record the synthetic image synthesized by said image synthesizing unit in a recording medium;
   a displaying unit configured to display the synthetic image recorded in the recording medium and read out from the recording medium on a display;
   a first changing unit configured to change the mapping mode to be used by said image synthesizing unit in response to a user instruction after the synthetic image is recorded in the recording medium and displayed on the display; and
   a second changing unit configured to change the coordinate transformation equation used for synthesizing the plurality of images into another synthetic image in accordance with the mapping mode changed by said first changing unit,
   wherein, when said second changing unit changes the coordinate transformation equation, said image synthesizing unit synthesizes the plurality of images into another synthetic image using the coordinate-space parameter read out from the memory and the coordinate transformation equation changed by said second changing unit without the regeneration of the coordinate-space parameter by said parameter generating unit.

2. An image synthesis apparatus according to claim 1, wherein said parameter generating unit includes a reference position setting unit, which arbitrarily sets a reference position of the synthetic image, and generates the coordinate-space parameter according to the reference position set by said reference position setting unit.

3. An image synthesis apparatus according to claim 2, wherein said parameter generating unit further generates at least one of a tone correction parameter, which synchronizes tones of adjacent images, and a position of a boundary line of adjacent images.

4. An image synthesis apparatus according to claim 3, wherein said storing unit for storing stores the parameters and the reference position according to setting, change or correction of the mapping mode, the reference position and the boundary line and can output the synthetic image with the parameters and the reference position being stored.

5. An image synthesis method comprising:
an image input step of inputting a plurality of images;
an extracting step of extracting a plurality of corresponding points within an overlapping area of adjacent images input by the image inputting step;
a parameter generating step of generating a coordinate-space parameter indicating a positional relationship between adjacent images input in the image input step on the basis of the extracted corresponding point;
a storing step of storing the coordinate-space parameter generated in the parameter generating step in a memory;
a selecting step of selecting a mapping mode from among a plurality of mapping modes in response to a user instruction;
an image synthesizing step of synthesizing, in an image synthesizing apparatus, the plurality of images into a synthetic image using a coordinate transformation equation corresponding to the mapping mode selected in the selecting step and the coordinate-space parameter previously stored in the memory and read out from the memory;
a recording step configured to record the synthetic image synthesized by said image synthesizing unit in a recording medium;
a displaying step configured to display the synthetic image recorded in the recording medium and read out from the recording medium on a display;
a first changing step configured to change the mapping mode to be used by said image synthesizing unit in response to a user instruction after the synthetic image is recorded in the recording medium and displayed on the display; and
a second changing step of changing the coordinate transformation equation used for synthesizing the plurality of images in accordance with the mapping mode changed by said first changing step,
wherein, when the second changing step changes the coordinate transformation equation, the image synthesizing apparatus combines the plurality of images into another synthetic image using the coordinate-space parameter read out from the memory and the coordinate transformation equation changed in second changing step without the regeneration of the coordinate-space parameter by the parameter generating step.

6. An image synthesis method according to claim 5, wherein the storing step stores a reference position of the synthetic image according to setting, change or correction of the mapping mode, the reference position and the boundary line and at least one of a tone correction parameter, which synchronizes tones of the adjacent images, and a position of a boundary line of the adjacent images, and further comprising an output step of outputting the synthetic image with the parameters and the reference position being stored.

7. A computer-readable storage medium encoded with a computer program for performing an image synthesis method, comprising:
an image input step of inputting a plurality of images;
an extracting step of extracting a plurality of corresponding points within an overlapping area of adjacent images input by the image input step;
a parameter generating step of generating a coordinate-space parameter indicating a positional relationship between adjacent images input in the image input step on the basis of the extracted corresponding point;
a storing step of storing the coordinate-space parameter generated in the parameter generating step in a memory;
a selecting step of selecting a mapping mode from among a plurality of mapping modes in response to a user instruction;
an image synthesizing step of synthesizing, in an image synthesizing apparatus, the plurality of images into a synthetic image using a coordinate transformation equation corresponding to the mapping mode selected in the selecting step and the coordinate-space parameter previously stored in the memory and read out from the memory;
a recording step configured to record the synthetic image synthesized by said image synthesizing step in a recording medium;
a displaying step configured to display the result of the synthesis performed by the image synthesizing step synthetic image recorded in the recording medium and read out from the recording medium on a display;
a first changing step configured to change the mapping mode to be used by said image synthesizing step in response to a user instruction after the synthetic image is recorded in the recording medium and displayed on the display; and
a second changing step of changing the coordinate transformation equation used for synthesizing the plurality of images in accordance with the mapping mode changed by said first changing step;
wherein, when the second changing step changes the coordinate transformation equation, the image synthesizing apparatus combines the plurality of images into another synthetic image using the coordinate-space parameter read out from the memory and the coordinate transformation equation changed in the second changing step without the regeneration of the coordinate-space parameter by the parameter generating step.

* * * * *